United States Patent [19]
Kurata et al.

[11] Patent Number: 5,345,863
[45] Date of Patent: Sep. 13, 1994

[54] CONTINUOUS WEB PRINTING APPARATUS

[75] Inventors: Shuichi Kurata, Osaka; Shiro Ichinose, Nishinomiya; Kazuo Kusaki, Shiga; Toshihiko Ishihara, Sanda; Naozumi Ueno, Osaka; Toru Morita, Kawanishi, all of Japan

[73] Assignees: Kanebo Ltd.; Tosmin Kogyo Co., Ltd., Tokyo, Japan

[21] Appl. No.: 97,660

[22] Filed: Jul. 26, 1993

[30] Foreign Application Priority Data

Jan. 28, 1993 [JP] Japan .................. 5-034489

[51] Int. Cl.$^5$ .................. B05C 17/06
[52] U.S. Cl. .................. 101/126; 400/56; 400/605; 400/611; 395/116; 395/131; 226/5; 226/28; 226/45; 226/96; 340/676; 347/4
[58] Field of Search .................. 400/126, 56–57, 400/58–59, 579, 618, 605, 611, 613, 614; 346/75, 140 R; 395/116, 131; 226/3, 5, 15, 16, 24, 27, 28, 45, 93, 96; 358/77, 80; 340/675, 676

[56] References Cited

U.S. PATENT DOCUMENTS

| 3,911,818 | 10/1975 | MacIlvaine | 346/75 |
|---|---|---|---|
| 4,655,622 | 4/1987 | Aoki | 400/121 |
| 4,810,006 | 3/1989 | Katz | 400/126 |
| 4,849,747 | 7/1989 | Ogawa et al. | 340/675 |
| 4,873,570 | 10/1989 | Suzuki | 358/80 |
| 4,933,866 | 6/1990 | Markoff et al. | 340/675 |
| 4,990,004 | 2/1991 | Kawahara et al. | 400/56 |
| 5,119,471 | 6/1992 | Kagaya et al. | 395/110 |
| 5,177,505 | 1/1993 | Sugiura et al. | 346/140 PD |
| 5,200,816 | 4/1993 | Rose | 358/80 |
| 5,245,362 | 9/1993 | Iwata et al. | 346/140 R |
| 5,262,872 | 11/1993 | Yoshimura et al. | 346/140 R |

FOREIGN PATENT DOCUMENTS 56-75870  6/1981  Japan .

*Primary Examiner*—Eugene H. Eickholt
*Attorney, Agent, or Firm*—Richard K. Warther

[57] ABSTRACT

According to the invention, there is provided a continuous web printing apparatus comprising transport means including an endless belt having a sticky surface, a plurality of support rollers having said endless belt entrained therearound and a drive means for rotating said support rollers to move said endless belt, a press means for pressing a continuous web, such as a fabric or transfer sheet, against said endless belt to stick said continuous web to said endless belt, an ink jet head disposed between said support rollers in opposed relation to the surface of said continuous web stuck to said endless belt, an abutment adapted to abut against said endless belt, said abutment being opposed to said ink jet head with the continuous web and said endless belt interposed therebetween, head gap adjusting means for moving at least either of said ink jet head or said abutment in a direction in which the two are opposed to each other, and recovering means for peeling said continuous web, which has passed by said ink jet head, from said endless belt for recovery.

13 Claims, 28 Drawing Sheets

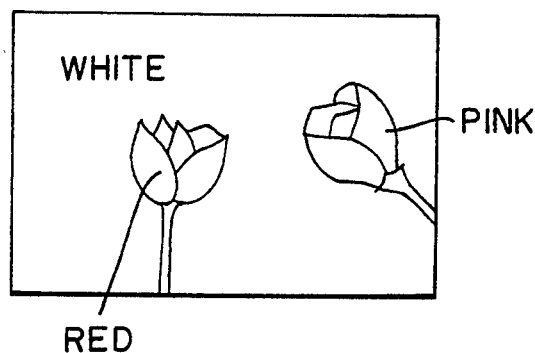
FIG. 25
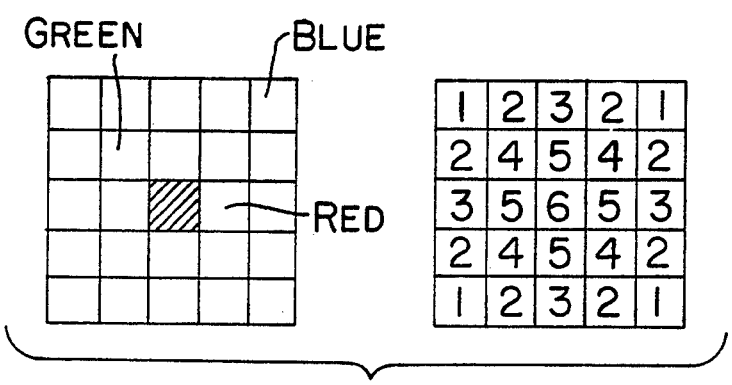
FIG. 26
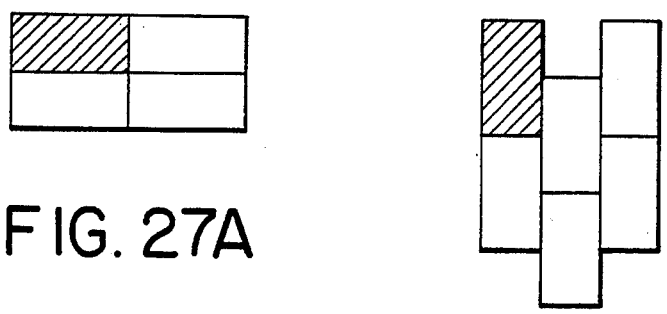
FIG. 27A
FIG. 27B

| SENSORS | 97 | 98 | 100 | 95 | 96 | ALARM OUTPUT | | | CONTROL |
|---|---|---|---|---|---|---|---|---|---|
| | | | | | | NO WEB | EXTREMES | THE OTHERS | |
| STATE | O | O | O | NC | NC | O | | | |
| | O | O | I | O | NC | | | | CORRECTING MOTOR START (LEFT) |
| | O | I | O | NC | NC | | | | |
| | O | I | I | NC | NC | | | O | CORRECTING MOTOR STOP |
| | I | O | O | NC | NC | | | O | |
| | I | O | I | NC | NC | | | O | CORRECTING MOTOR START (RIGHT) |
| | I | I | O | NC | NC | | | | CORRECTING MOTOR STOP |
| | I | I | NC | NC | O | | O (LEFT) | | |
| | NC | NC | NC | I | NC | | | | |
| | NC | NC | NC | NC | I | | O (RIGHT) | | CORRECTING MOTOR STOP |
| REMARKS | O LIGHT TRANSMITTING I LIGHT SHADING NC NOT CONCERNED | | | O WITHIN THE LIMITS I BEYOND THE LIMITS NC NOT CONCERNED | | | | SENSOR TROUBLE FOREIGN SUBSTANCE ATTACHED ETC | |

FIG. 33

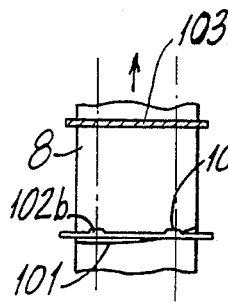 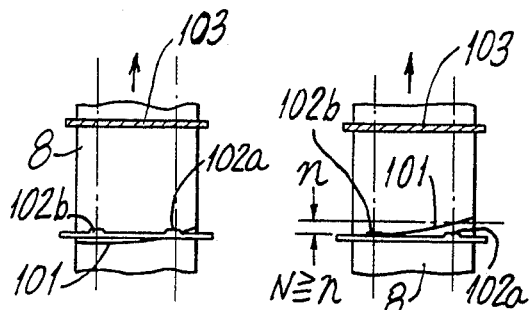 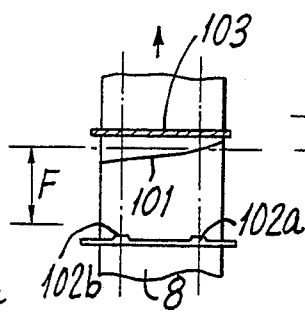 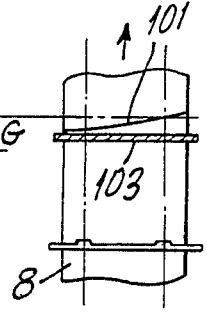
FIG. 36A   FIG. 36B   FIG. 36C   FIG. 36D
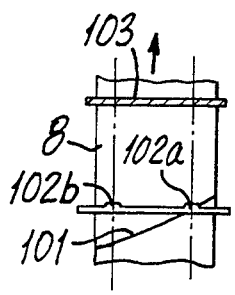 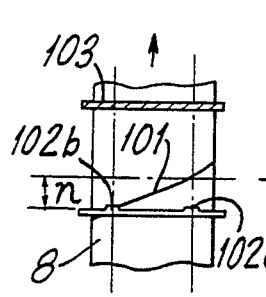 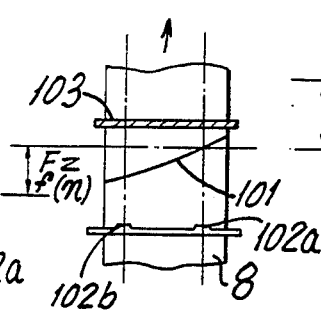 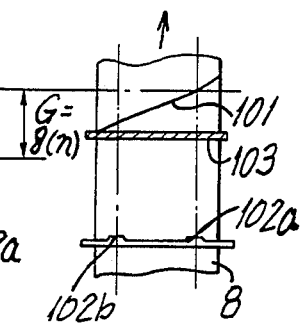
FIG. 38A   FIG. 38B   FIG. 38C   FIG. 38D
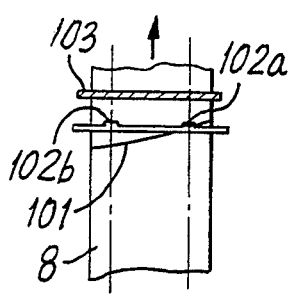 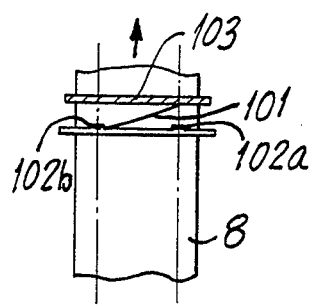
FIG. 39A   FIG. 39B

CONTINUOUS WEB PRINTING APPARATUS

FIELD OF THE INVENTION

This invention relates to a continuous web printing apparatus for printing a continuous web, such as a fabric or a transfer sheet.

PRIOR ART

A conventional example (Japanese Laid-Open Patent Publication No. 75870 of 1981) is shown in FIG. 44. In the continuous web printing apparatus shown, a continuous web 116 is transported in close contact relation with a platen roller 115 by pinch rollers 117, 118. A ink jet head 119 is mounted on scanning rails 121, it including a head surface 119 opposed to the continuous web on the platen roller 115. The ink jet head 119 is reciprocatingly moved widthwise of the continuous web 116, ink drops being sprayed from a nozzle row formed in the head surface 120, so as to print the continuous web 116.

In this continuous web printing apparatus, however, if said nozzle row is arranged in the same direction as the direction of transport of said continuous web, i.e., in the vertical direction in FIG. 44, it results in drawbacks, including incorrect reproduced colors and distorted images, depending upon the length of the nozzle row, since the surface to be printed of the continuous web 116 is arcuate.

If the printing efficiency is considered, generally, the longer the nozzle row, the more desirable. Reversely, if it is too long, the uppermost, intermediate and lowermost nozzles greatly differ in the distance to the surface of the continuous web (ink drop flying distance=head gap). Therefore, the uppermost and lowermost nozzles produce greater variations in the flying direction of ink drops, resulting in deviation of landing points of ink drops, thus causing incorrect reproduction of colors. Further, even if there is no variation in the flying direction of ink drops, the distance between adjacent ink drops landing on the continuous web 16 is wider at the uppermost and lowermost nozzles so that the printed images are distorted.

On the other hand, the diameter of the platen roller 115 can be sufficiently increased in order to decrease the incorrectness of reproduced colors and the distortion of images to a negligible degree. However, such arrangement leads to an increase in the size of the apparatus, an increase in the driving motor load, and an increase in the size of the head gap adjusting mechanism.

Further, since a tensile force is applied to the continuous web 116 during its transport, the continuous web 116 is in the stretched state during printing and released from stretching after printing. Accordingly, there is a drawback that the patterns printed on the continuous web 116 are distorted.

Further, the tensile force applied to the continuous web 116 is not uniform, so that even if the continuous web 116 is constrained around the platen roller 115, there is still a variation in the amount of stretch, making it impossible to attain homogeneous printing.

Further, since the surface of the continuous web constrained around the platen roller 115 is not always flat but is undulating, it hinders desired printing and interferes with the scanning of the ink jet head 119.

SUMMARY OF THE INVENTION

Accordingly, an object of the invention is to provide a continuous web printing apparatus designed to prevent undulation of a continuous web and distortion of patterns to ensure homogeneous printing, so that an image having good color reproducibility can be obtained without any distortion.

According to the invention, there is provided a continuous web printing apparatus comprising transport means including an endless belt having a sticky surface, a plurality of support rollers having said endless belt entrained therearound and a drive means for rotating said support rollers to move said endless belt, a press means for pressing a continuous web, such as a fabric or transfer sheet, against said endless belt to stick said continuous web to said endless belt, an ink jet head disposed between said support rollers in opposed relation to the surface of said continuous web stuck to said endless belt, an abutment adapted to abut against said endless belt, said abutment being opposed to said ink jet head with the continuous web and said endless belt interposed therebetween, head gap adjusting means for moving at least either of said ink jet head or said abutment in a direction in which the two are opposed to each other, and recovering means for peeling said continuous web, which has passed by said ink jet head, from said endless belt for recovery.

Therefore, according to the invention, when the transport means is driven to move the endless belt while sticking the continuous web to the endless belt by the press means, the continuous web is transported integrally with the endless belt. The continuous web stuck to the endless belt is sprayed with ink drops by the ink jet head to be printed when transported over the abutment. The printed continuous web is peeled for recovery from the endless belt by the recovering means.

In this case, since the continuous web is pressed against the endless belt, no undulations are formed on the continuous web. Since the continuous web is printed by sticking it to the endless belt, no tension is applied to the continuous web. Further, since it is printed in its planar state at the position of the abutment, the head gap is kept constant. Therefore, undulations before printing and distortion after printing are prevented and hence homogeneous printing is available. Images having good reproduced colors without distortion can be obtained. Further, by moving at least either of the ink jet head or the abutment, the head gap can be adjusted easily and accurately.

A continuous web printing apparatus embodying the invention will be described with reference to the accompanying drawings.

BRIEF DESCRIPTION OF THE DRAWINGS

FIG. 25 shows an example of a design original having liability to cause erroneous decomposition noise in the color transform device of FIG. 21;

FIG. 26 is a diagram showing the weight coefficient for distance in the output image data when the erroneous decomposition noise is to be erased in the color transform device of FIG. 21;

FIGS. 27A and 27B are each a view showing the regular continuous states of printed patterns, wherein FIG. 27(A) refers to the step feed and FIG. 27(B) refers to the half feed;

FIG. 33 is a diagram showing combinations of signals from sensors shown in FIG. 32;

FIG. 36A-36D are explanatory views showing devices for detecting seam in the continuous web of FIG. 1;

FIG. 38A-38D are explanatory views of another embodiment of the devices of FIGS. 36A-D;

FIGS. 39A-B are explanatory views of other embodiment of the devices of FIGS. 36A-D;

DESCRIPTION OF A PREFERRED EMBODIMENT

Figure 1:
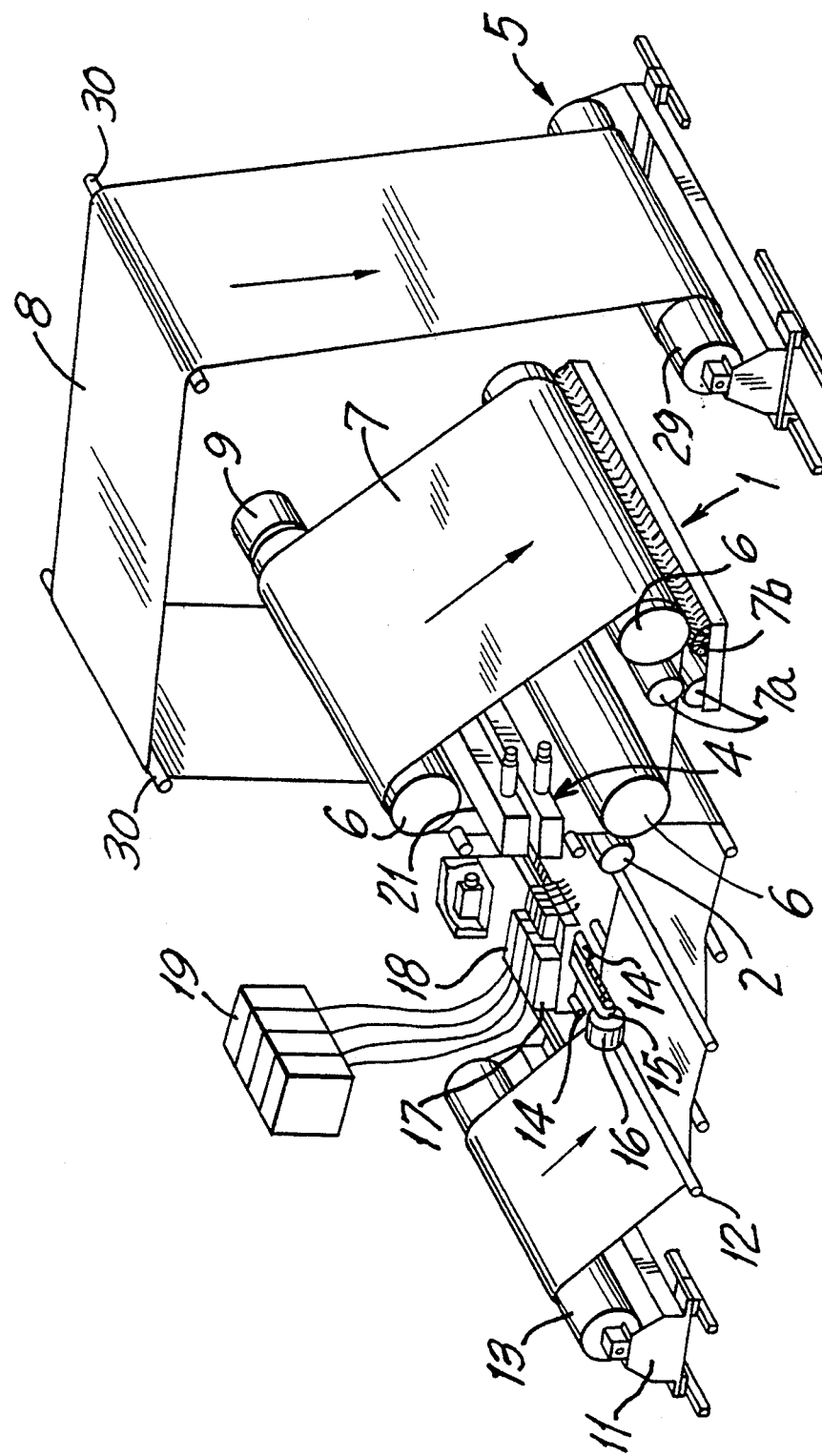
FIG. 1 is a perspective view of a preferred embodiment of the invention.

Referring to FIG. 1, a continuous web printing apparatus according to this invention is shown. This apparatus comprises a transport means 1, press means which comprises a press roller 2 in the embodiment, an ink jet head 3, head gap adjusting means 4, and recovering means 5.

The transport means 1 comprises an endless belt 7 having a sticky surface, a plurality of support rollers 6 having the endless belt entrained therearound, and a drive means 9 for rotating the support rollers 6 to move the endless belt 7. The endless belt 7 is a fabric transport belt made of metal, consisting mainly of nickel and produced by plating. It has a thickness of about 100 $\mu$m, and does not stretch, having the property of being high in positioning accuracy. Further, to impart stickiness, an acrylic permanent type pressure-sensitive adhesive resin (Liquitack K-6, manufactured by Dairiki Co., Ltd.) is applied to its surface. In this embodiment, the coating thickness is about 50 $\mu$m.

The support rollers 6 are formed of steel pipe, three rollers 6 being disposed substantially at the vertexes of a right-angled triangle. The drive means 9 comprises a direct drive motor, driving one of the support rollers 6. Therefore, the support roller 6 connected to the drive means 9 serves as a driving roller, the other support rollers 6 being driven rollers. The driving roller is rotated by the drive means 9 so that the endless belt 7 is moved in the direction of arrow in FIG. 1. A control device (not shown) controls the drive means 9 so that the endless belt 7 is intermittently moved by an amount corresponding to the length of the nozzle row for each scanning of the ink jet head 3.

The press roller 2 presses the continuous web 8 against the endless belt 7 to stick the continuous web 8 to the endless belt 7. The press roller 2 has its surface covered with rubber, and presses the endless belt 7 on the surface of one of the support rollers 6 with a pressure of about 100 kg. The continuous web 8 is a fabric in the embodiment and is delivered through a guide roller 12 from supply means 11 having a delivery roll 13 with the fabric wound thereon. The continuous web 8 is inserted between the press roller 2 and the endless belt 7 and is pressed against the endless belt 7 by the press roller 2 so that, the continuous web 8 is stuck to the endless belt 7 and transported to the ink jet head 3. Other press means such as a press plate or a pressurized air stream may be substituted for the press roller 2.

The ink jet head 3 is disposed between the support rollers 6 in opposed relation to the surface of the continuous web 8 stuck to the endless belt 7. The ink jet head is known in itself. The apparatus includes scanning rails 14 extending widthwise of the continuous web 8, a driving belt 15, a main scanning motor 16, a carriage 17, buffer ink tanks 18 installed on a plurality of portions of the ink jet head 3 for different colors, and main tanks 19. Ink drops are sprayed selectively from the individual portions of the ink jet head 3 whose operation is controlled by the control device (not shown), whereby the continuous web 8 is printed with patterns.

Figure 2:
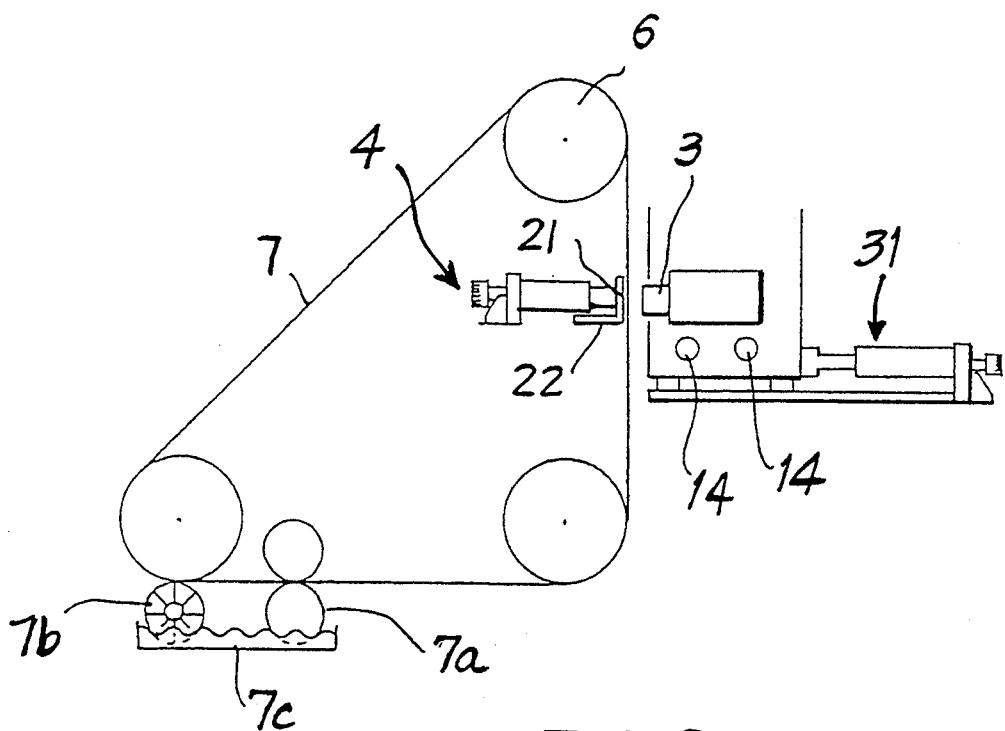
FIG. 2 is a side view showing the relation between an ink jet head, an endless belt and an abutment shown in FIG. 1.
Figure 4:
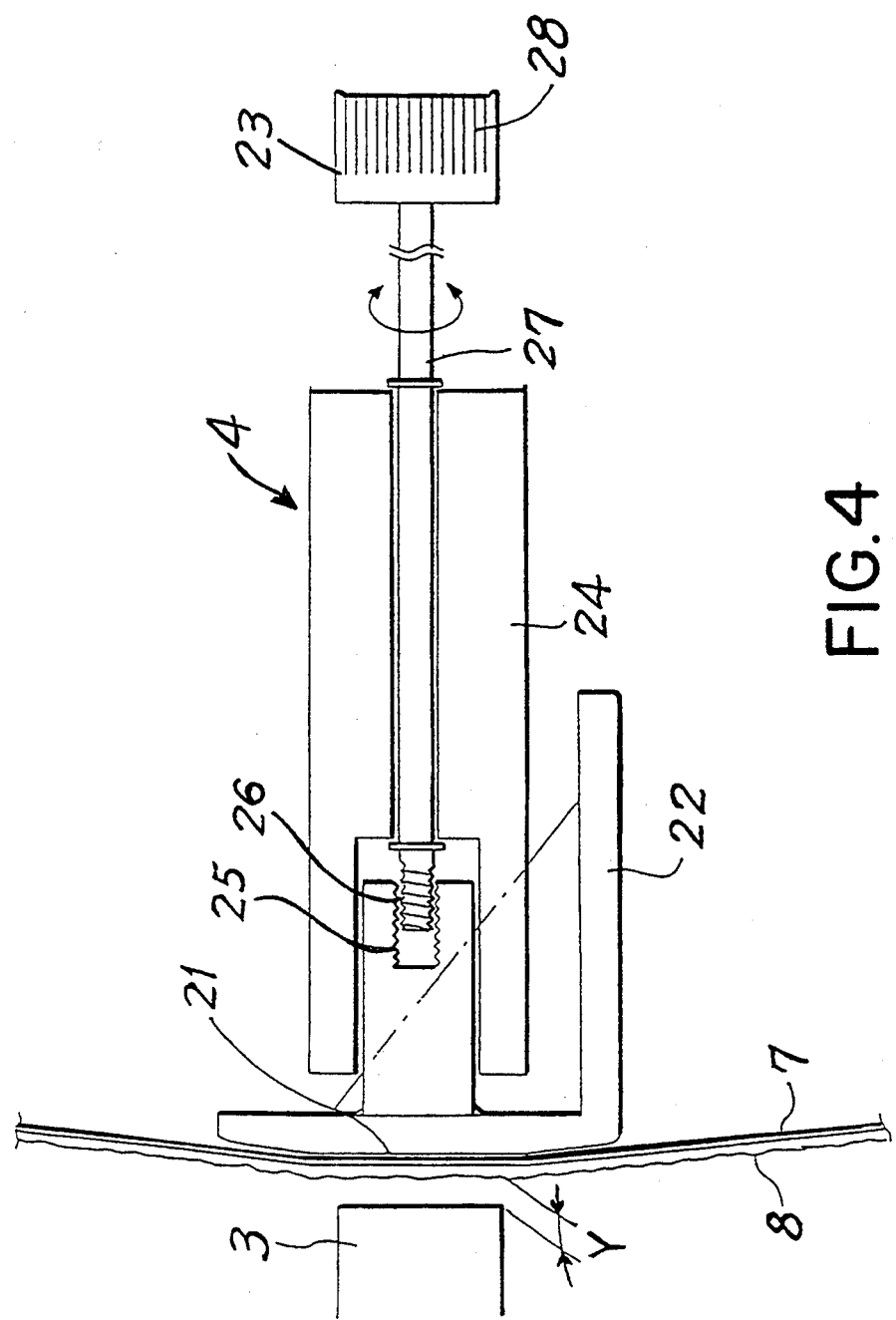
FIG. 4 is a sectional view of head gap adjusting means.

As shown in FIGS. 2 and 4, the apparatus includes an abutment 21 adapted to abut against the endless belt 7 at a position opposed to the ink jet head 3 with the continuous web 8 and endless belt 7 interposed therebetween, the abutment 21 being defined by the abutting surface of a movable member 22. The adjusting means 4 is adapted to move the abutment 21 in the direction in which the ink jet head 3 and the abutment 21 are opposed to each other, the adjusting means 4 having an adjusting handle 23. The member 22 is made of iron and is slidably supported on a fixed portion 24. Further, the adjusting handle 23 is mounted on a rotatable shaft 27 having a male thread portion 26 threadedly fitted with a female thread portion 25 of the member 22. The numeral 28 denotes a graduated surface. Rotating the adjusting handle 23 advances or retracts the abutment 21 of the member 22 by about 1 mm per revolution, thereby adjusting the head gap Y between the ink jet head 3 and the continuous web 8 according to the thickness of the continuous web 8. In addition, the movement of the abutment 21 somewhat changes the tension on the endless belt 7, but does not influence the transport accuracy since the amount of movement of the member 22 is about 1 mm or less. Further, the abutment 21 has a greater width in the transport direction than the width of the ink jet head 3 in the same direction, thereby securing the flatness of the surface to be sprayed with ink drops from the ink jet head 3.

The recovering means 5 is adapted to peel the continuous web 8 passing by the ink jet head 3 from the endless belt 7. In the embodiment, a winding roller 29 is provided for imparting tensile force required to peel the continuous web 8 after printing from the endless belt 7. Further, a plurality of guide rollers 30 are disposed between the winding roller 29 and the endless belt 7. One of the guide rollers 30 is disposed adjacent the support roller 6 for the endless belt 7. At this position the continuous web is peeled from the endless belt 7.

This apparatus has head gap adjusting means 31 for moving the ink jet head 3 in the direction in which the ink jet head 3 and the abutment 21 are opposed to each other, thereby adjusting the head gap Y. The adjusting means 31 is constructed substantially in the same manner as the adjusting means 4.

Figure 3:
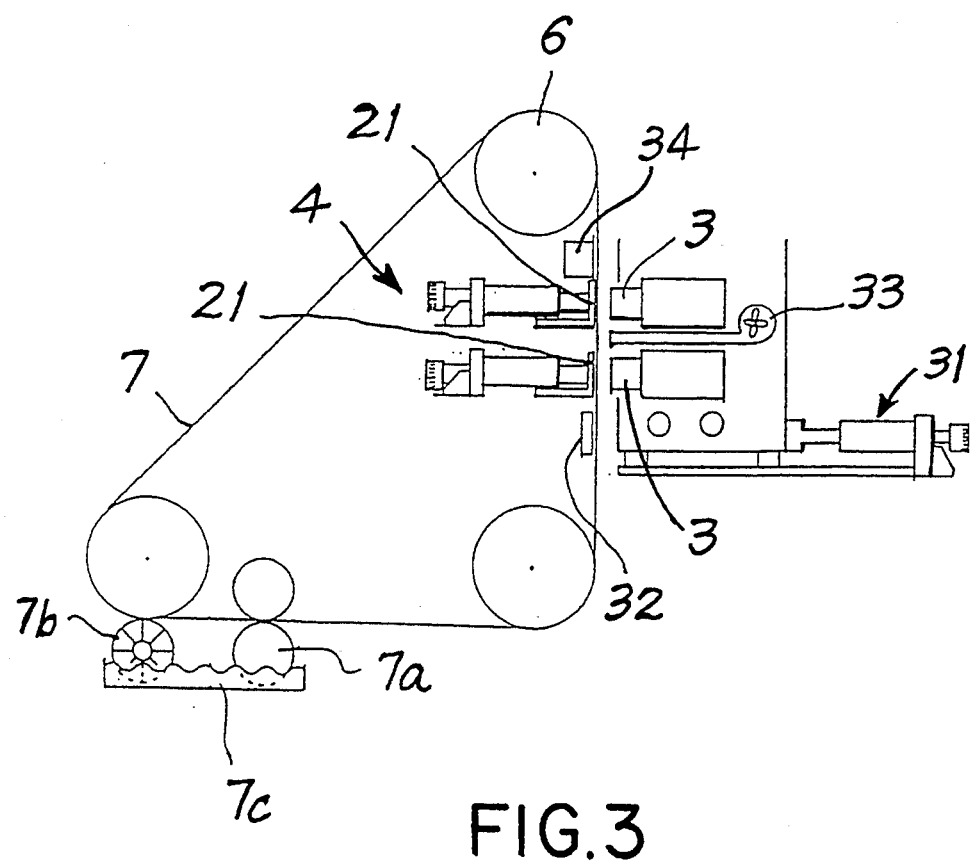
FIG. 3 is a side view showing another embodiment of the invention.

As shown in FIG. 3, the apparatus may include upper and lower sets of the ink jet heads 3 and the abutments 21 opposed to each other so that the continuous web 8 is printed by the lower ink jet head 3 and then printed in layers by the upper ink jet head 3 to improve the printing and deepen the color. In the embodiment, a preheating heater plate 32 is preferably disposed under the lower abutment 21 to preheat the endless belt 7. A hot air heater 33 is preferably disposed above the lower ink jet head 3 to dry the ink sprayed on the continuous web 8. The continuous web 8 is then printed by the upper ink jet head 3. In addition, a water cooling type of belt cooling plate 34 is preferably provided for cooling the endless belt 7 to prevent the relaxation of the endless belt 7 caused by thermal expansion, and the heat conduction to the support rollers 6.

In this apparatus, when the transport means 1 is driven to move the endless belt 7, the continuous web 8 is stuck to the endless belt 7 by the press roller 2 and transported integrally with the endless belt 7. The continuous web 8 is sprayed with ink drops to be printed when it is being transported over the abutment 21. The printed continuous web 8 is peeled for recovery from the endless belt 7 by the recovering means 5.

In this case, since the continuous web 8 is pressed against the endless belt 7, no undulations are formed on the continuous web 8. Since the continuous web 8 is printed by sticking it to the endless belt, no tension is applied to the continuous web 8. Further, since it is printed in its planar state at the position of the abutment 21, the head gap is kept constant. Therefore, undulations before printing and distortion after printing are prevented so that homogeneous printing is available. Images having good reproduced colors without distortion can be obtained. Further, by moving the movable member 22 of the adjusting means 4, the head gap can be adjusted easily and yet accurately.

Further, since the width of the abutment 21 in the direction of transport of the endless belt 7 is greater than that of the ink jet head 3 in the same direction, incorrectly reproduced color and distorted images can be voided more reliably.

In addition, in sticking the continuous web 8 to the endless belt 7, if the continuous web 8 is a fabric or the like liable to wrinkle, it is preferable that a fabric spreader is positioned upstream of the press roller 2 for prevention of wrinkling.

In the invention, the continuous web 8 includes a transfer sheet. In use, after printed, the transfer sheet is placed on a fabric and then heat-treated in a press machine to effect transfer.

Figure 6:
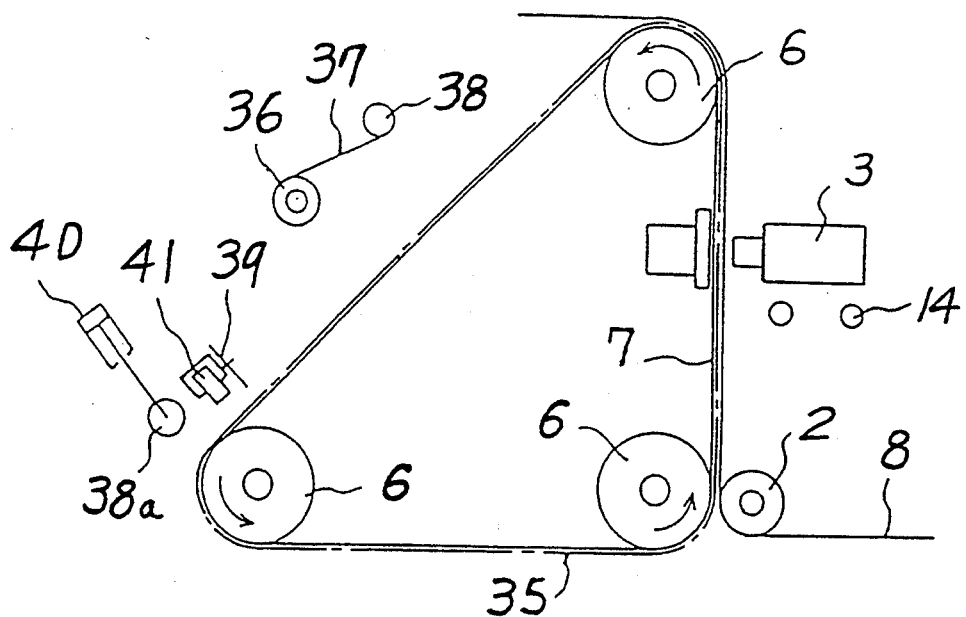
FIG. 6 is a side view showing a device for sticking a adhesive double coated film to the endless belt.

The sticky endless belt 7 may be an endless belt having an adhesive double coated sheet stuck thereto. In the embodiment shown in FIG. 6, an adhesive double coated film 35 is used as the adhesive double coated sheet and is stuck to the belt 7. The adhesive double coated film 35 consists of a PET (polyethylene terephthalate) film and adhesive layers. The PET film is 50 μm in thickness, the surface on the belt side thereof being corona-treated, the surface on the reverse side of the film being treated with sand mat. Adhesive layers are formed on both surfaces of the PET film. The adhesive layers are of the acrylic or silicone type.

Further, this apparatus has a supply source for the continuous adhesive double coated film 35. The supply source comprises a roll 36 having the continuous adhesive double coated film 35 wound thereon, a release paper sheet 37 being stuck to one surface of the continuous adhesive double coated film 35, and led to a winding reel 38. Further, a sticking roller 38a is disposed in opposed relation to the belt 7. A cutter 39 is interposed between the roll 36 and the sticking roller 38a. The sticking roller 38a is adapted to be pressed against the continuous adhesive double coated film 35 on the belt 7 and is connected to a cylinder 40. The cutter 39, which is used to cut the continuous adhesive double coated film 35, is in the form of a manual rotary cutter supported on a guide rail 41 extending widthwise of the continuous adhesive double coated film 35. Therefore, the cutter 39 can be moved along the guide rail 41 and hence widthwise of the continuous adhesive double coated film 35.

Figure 7:
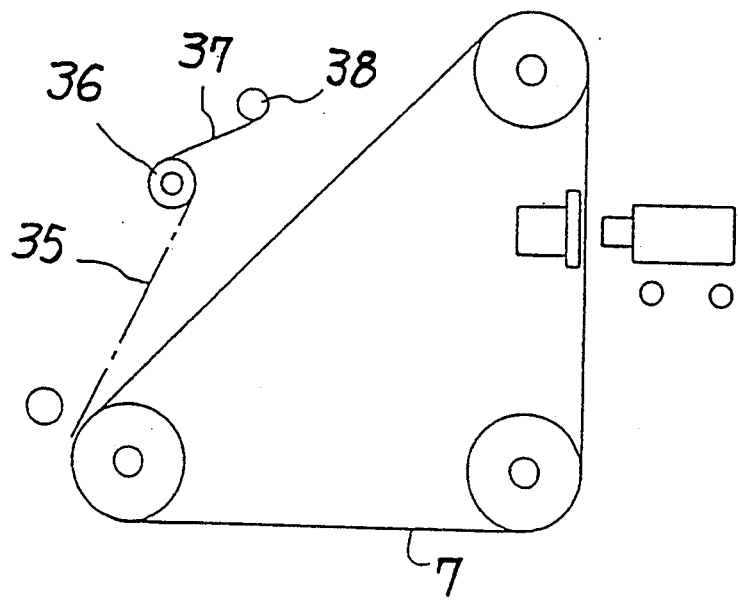
FIG. 7 is a side view showing the step of renewing the adhesive double coated film of FIG. 6.
Figure 8:
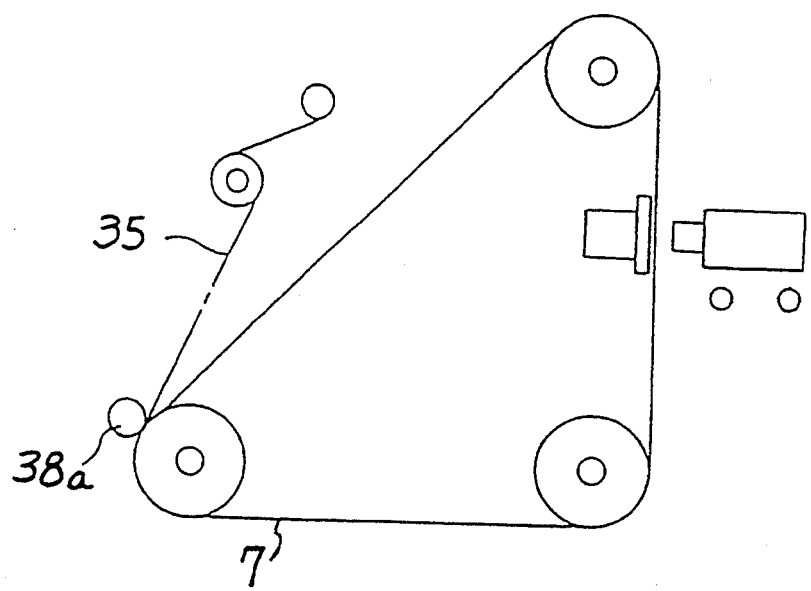
FIG. 8 is a side view showing the step next to the step of FIG. 7.

Therefore, when the sticking strength of the adhesive double coated film 35 on the belt 7 has degraded, it can be easily renewed. In renewing the adhesive double coated film 35, the press roller 2 is retracted from the belt 7. The adhesive double coated film 35 is then peeled from the belt 7. The continuous adhesive double coated film 35 is with drawn and fed from the roll 36 as shown in FIG. 7. The release paper sheet 37 is peeled from the continuous adhesive double coated film 35 and wound on the winding reel 38, the continuous adhesive double coated film 35 is led and stuck to the belt 7. The sticking roller 38a is then operated by the cylinder 40 to be pressed against the continuous adhesive double coated film 35 on the belt 7, as shown in FIG. 8, preferably in a position spaced some centimeters apart from the leading end of the continuous adhesive double coated film 35.

Figure 9:
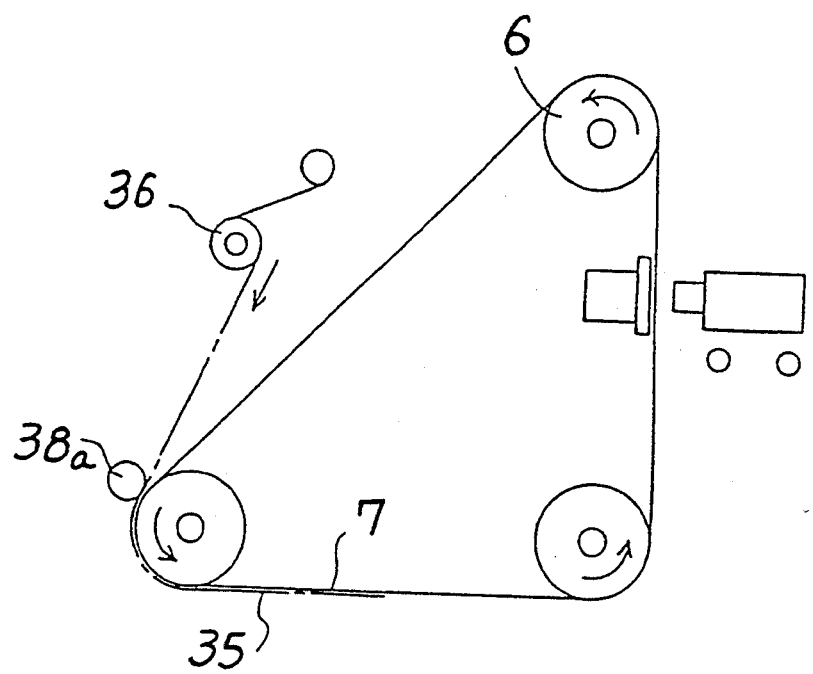
FIG. 9 is a side view showing the step next to the step of FIG. 8.
Figure 10:
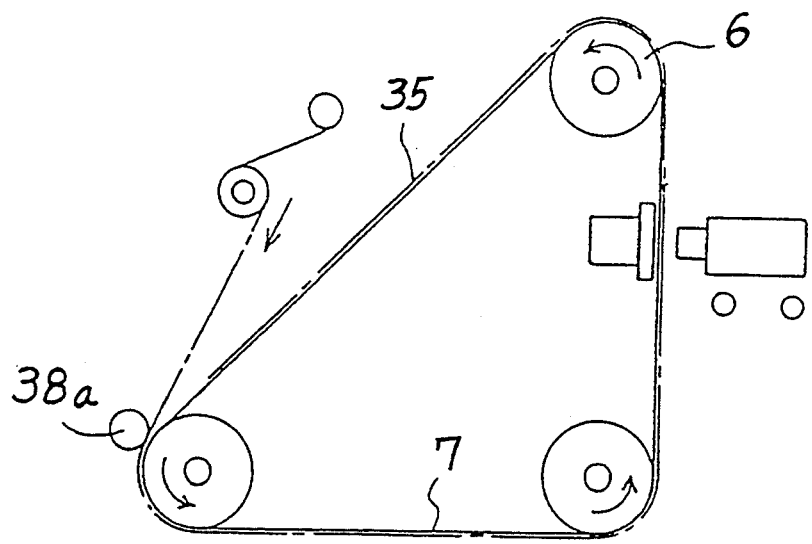
FIG. 10 is a side view showing the step next to the step of FIG. 9.

Thereafter, as shown in FIG. 9, the belt 7 is driven by the support rollers 6, the sticking roller 38a acting on the adhesive double coated film 35 so that the adhesive double coated film 35 is withdrawn from the roll 36 and stuck to the belt 7 in accordance with the movement of the belt 7. Further, brake torque is applied to the roll 36 to impart tension to the adhesive double coated film 35, the adhesive double coated film 35 being withdrawn by tension so that the adhesive double coated film 35 can be firmly stuck to the belt 7. Thereafter, as shown in FIG. 10, when the leading end of the continuous adhesive double coated film 35 reaches the position of the cutter 39, the belt 7 is once stopped. The amount of travel of the belt 7 until its stoppage is predetermined, the belt 7 being automatically stopped. The stop position is accurate to some $\mu m$.

Figure 11:
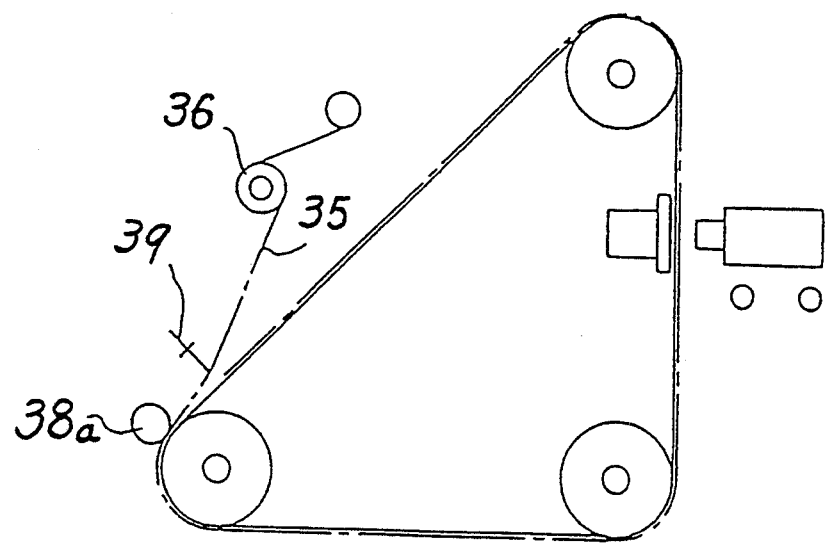
FIG. 11 is a side view showing the step next to the step of FIG. 10.

As shown in FIG. 11, the cutter 39 is then moved widthwise of the continuous adhesive double coated film 35, thereby cutting the latter at a position where the cutter 39 is opposed to the leading end of the continuous adhesive double coated film 35. The belt 7 is then driven again, the sticking roller 38a acting on the adhesive double coated film 35 so that the adhesive double coated film 35 is stuck to the belt 7 at the trailing end of the adhesive double coated film 35. The trailing end of the adhesive double coated film 35 is therefore aligned with the leading end thereof on the belt 7.

Figure 12:
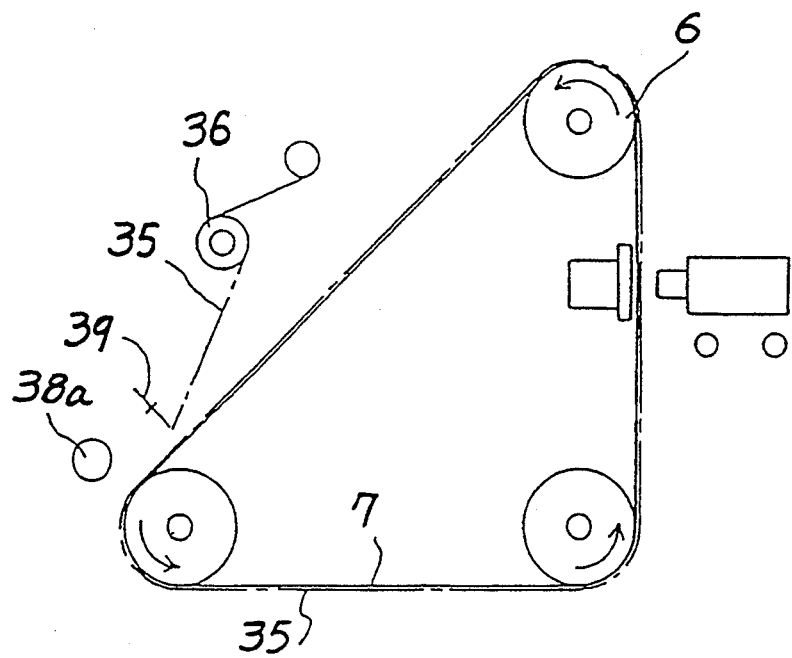
FIG. 12 is a side view showing the step next to the step of FIG. 11.

Thus, the adhesive double coated film 35 can be renewed. Thereafter, as shown in FIG. 12, the sticking roller 38a is retracted from the adhesive double coated film 35. The adhesive double coated film 35 is wound on the roll 36. Thereafter, the continuous web 8 is led to the endless belt 7 of metal and stuck to the adhesive double coated film 35. Accordingly, the continuous web 8 can be stuck to and intermittently transported by the endless belt 7 of metal.

Therefore, even if the sticking strength of the adhesive double coated film 35 on the belt 7 is degraded, it is only necessary to renew the adhesive double coated film 35. It is safe and hygienic. The renewing operation is easy, requiring no appreciable time or labor. Therefore, it is possible to decrease the maintenance cost and increase the operating efficiency.

Figure 13:
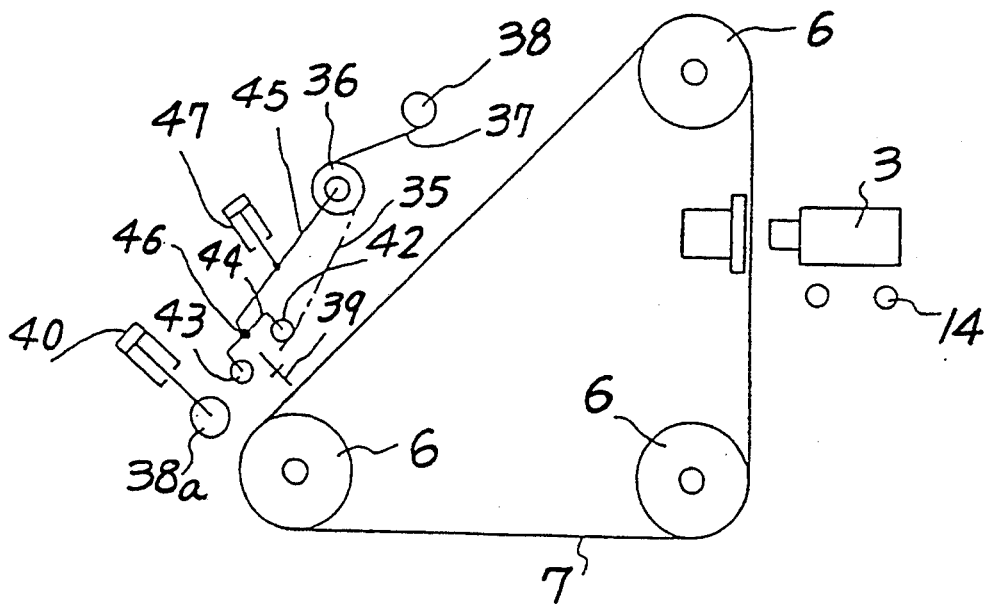
FIG. 13 is a side view of another embodiment of the device of FIG. 6.

In the embodiment shown in FIG. 13, a pair of auxiliary rollers 42 and 43 are disposed between a roll 36 and a sticking roller 38a, with the leading end of the continuous adhesive double coated film 35 being temporarily fixed to one of the auxiliary rollers 42. Links 44 are disposed at the opposite ends of each auxiliary rollers 42 and 43 so that the auxiliary rollers 42 and 43 are supported by the links 44. The links 44 are supported by the pin 46 of an arm 45 for rockingly movement about the pin 46. The arm 45 is swingingly movable about the roll 36 and connected to a cylinder 47.

Figure 14:
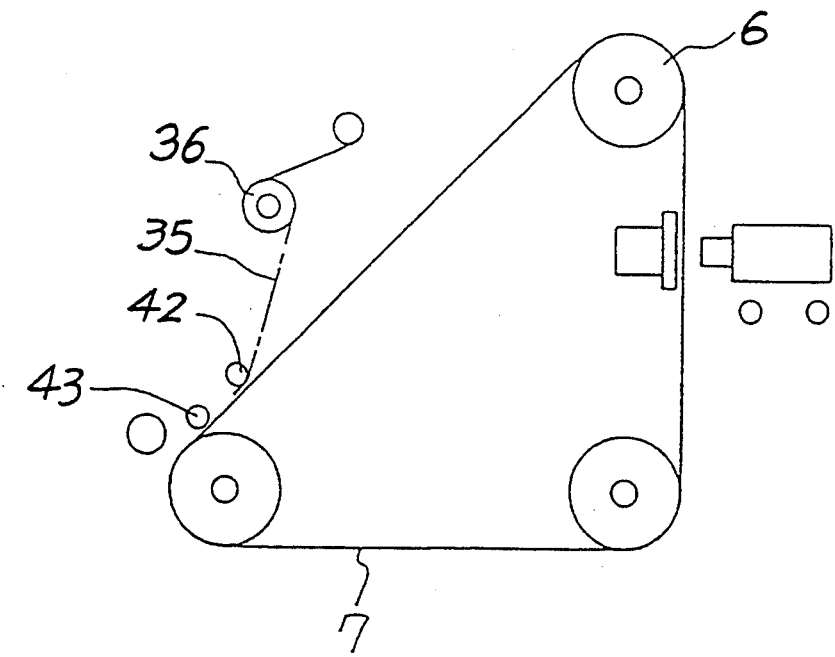
FIG. 14 is a side view showing the step of renewing the adhesive double coated film of FIG. 13.
Figure 15:
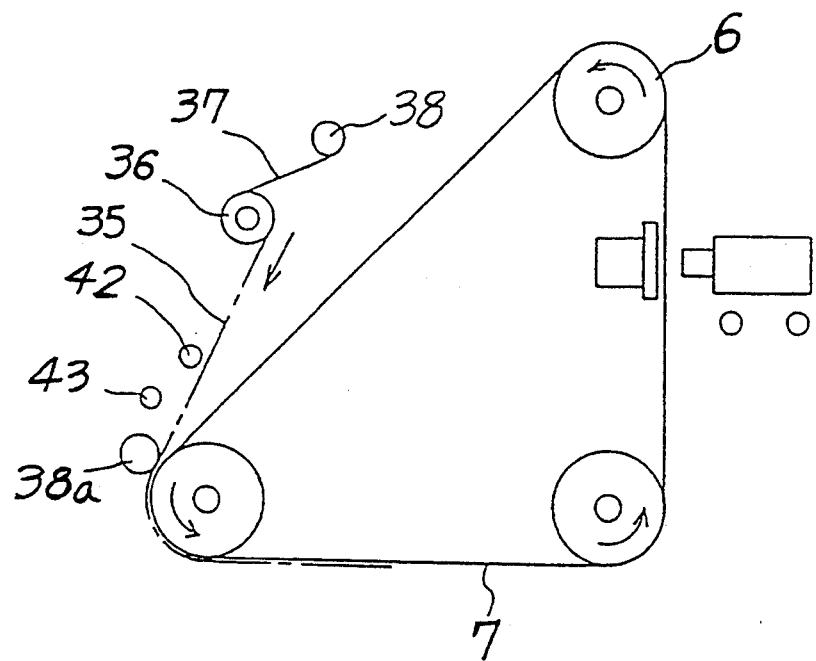
FIG. 15 is a side view showing the step next to the step of FIG. 14.

In sticking the continuous adhesive double coated film 35 on the belt 7, as shown in FIG. 14, the arm 25 is swingingly moved by the cylinder 47, the auxiliary rollers 42 and 43 moving to the belt 7 so that the continuous adhesive double coated film 35 is pressed against and stuck to the belt 7. Thereafter, the belt 7 is driven by the support roller 6. Therefore, the auxiliary rollers 42 and 43 acts on the continuous adhesive double coated film 35 so that the continuous adhesive double coated film 35 is withdrawn from the roll 36 and stuck to the belt 7 in accordance with the movement of the belt 7. Thereafter, as shown in FIG. 15, the sticking roller 38a is pressed against the continuous adhesive double coated film 35 on the belt 7. The auxiliary rollers 42 and 43 are retracted from the belt 7 and the continuous adhesive double coated film 35. Therefore, in a same manner as in the apparatus of FIG. 6, the sticking roller 38a acts on the continuous adhesive double coated film 35, the continuous adhesive double coated film 35 being withdrawn and stuck.

Figure 16:
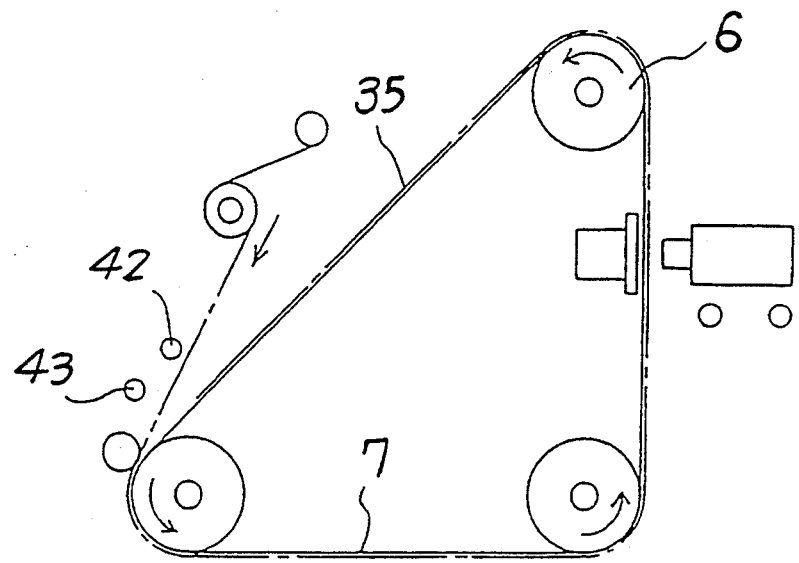
FIG. 16 is a side view showing the step next to the step of FIG. 15.
Figure 17:
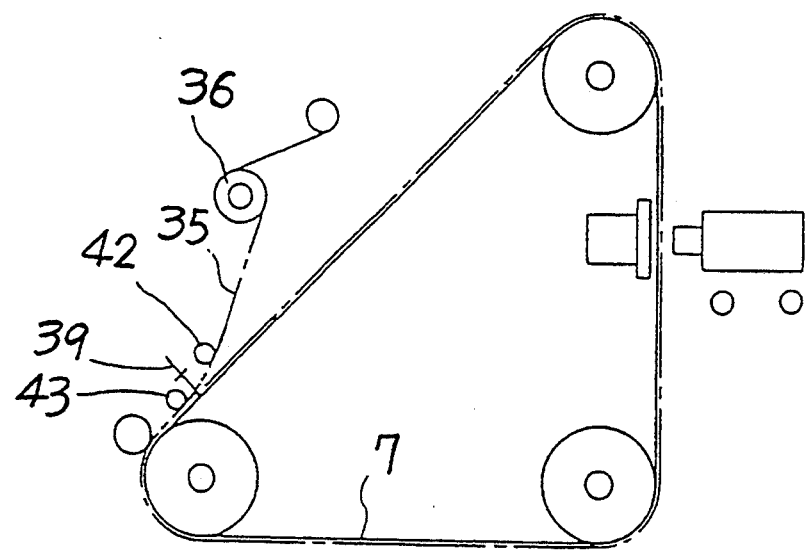
FIG. 17 is a side view showing the step next to the step of FIG. 16.

Thereafter, as shown in FIG. 16, when the leading end of the continuous adhesive double coated film 35 reaches the position of the cutter 39 between the auxiliary rollers 42 and 43, the belt 7 is once stopped. As shown in FIG. 17, the auxiliary rollers 42 and 43 move to the belt 7 to be engaged to the continuous adhesive double coated film 35. Therefore, the tension of the continuous adhesive double coated film 35 acts on the the auxiliary roller 42 and the link 44 between the auxiliary roller 43 and the roll 36 so that the link 44 is rockingly moved about the pin 46. The stroke of the cylinder 47 is predetermined so that the auxiliary roller 43 moves to the belt 7 but the auxiliary roller 42 does not reach the belt 7. Therefore, the continuous adhesive double coated film 35 contacts to the belt 7 at the position of the auxiliary roller 43, while the continuous adhesive double coated film 35 is kept apart from the belt 7 between each auxiliary rollers 42 and 43.

Figure 18:
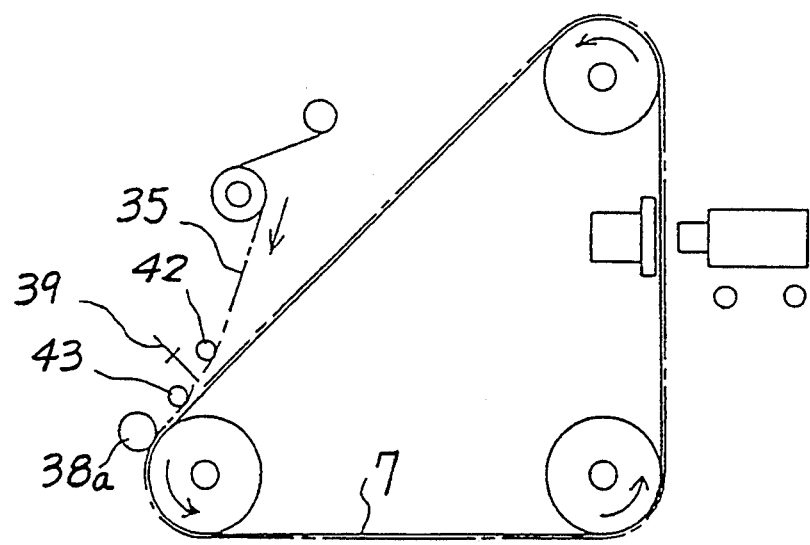
FIG. 18 is a side view showing the step next to the step of FIG. 17.

Thereafter, as shown in FIG. 18, between each auxiliary rollers 42 and 43, the cutter 39 runs widthwise of the continuous adhesive double coated film 35 so that the continuous adhesive double coated film 35 is cut by the cutter 39. Therefore, the leading end of the continuous adhesive double coated film 35 is temporarily fixed to an auxiliary roller 42. At the same time, the other auxiliary roller 43 acts on the adhesive double coated film 35 on the belt 7 so that the trailing end of the adhesive double coated film 35 is pressed against the belt 7 and temporarily fixed. Therefore, the trailing end of the adhesive double coated film 35 does not curl. Thereafter, the belt 7 is again driven, the sticking roller 38a acting on the adhesive double coated film 35, so that the adhesive double coated film 35 is stuck at the trailing end thereof. Thereafter, the auxiliary rollers 42 and 43 and the sticking roller 38a are retracted to and standby at the original positions.

Any other synthetic resin film can be used in place of the PET film, with adhesive layers formed on both surfaces thereof. The material of the adhesive layer is also optional. Any adhesive having adhesion to the continuous web 8 and the endless metal belt 7 can be used for forming the adhesive layer.

Adhesive layers may be formed on both surfaces of a synthetic resin film, with fine pores formed in the synthetic resin film and the adhesive layers, so that air can escape from the interface between the endless metal belt 7 and the adhesive double coated film 35 when the film is stuck on the belt. In the case, no unevenness is formed on the surface favorably. For example, on both surfaces of a polyethylene terephthalate resin film ( 200 μm thick, basis weight 105 g/m²), an adhesive solution consisting of 70 parts by weight of an acrylic resin, Liquitack K, ( manufactured by Dairiki Co., Ltd. ) and 30 parts by weight of a lacquer thinner ( manufactured by Toyo Ink Co., Ltd. ) is coated by a reverse coater, and dried. Fine pores of 100 μm pore size and 100 pores/m² pore number are then formed by a card clothing roll. Thereafter, it is stuck on an endless metal belt 7 under a roll pressure of 2 kg/cm². In this case, no unevenness is formed on the surface thereof. No unevenness is formed on the surface of the continuous web 8 stuck on it so that a uniform printing can be made. A printed product of high quality can be obtained.

Any other adhesive double coated sheet can be used in place of the adhesive double coated film 35. For example, it can be thought to use an adhesive double coated sheet consisting of a nonwoven fabric and a fine pore adhesive film. In this case, the nonwoven fabric is required to have an BMD value of not higher than 10 microns measured by KES system. The KES system is an abbreviation of Kawabata evaluation system and is an evaluation method originated by Prof. Kawabata of Kyoto University. The SMD value according to KES system is calculated by the following equation.

$$SMD = \frac{1}{X} \int_0^x |T - Ta| dx$$

where
T: Thickness of the sample at the position x (thickness measured by a contact)
Ta: Average value of T.

When the SMD value is not higher than 10 microns, the surface of the nonwoven fabric is smooth and no unevenness is formed. Therefore, a preferred adhesive double coated sheet can be obtained by coating an organic solvent solution of a synthetic polymer on both surfaces thereof, immersing it in a coagulation bath and forming a fine pore adhesive film by the synthetic polymer.

Any type of nonwoven fabric can be used. Any synthetic polymer can be also used which is soluble in an organic solvent and can form a fine porous adhesive film. The synthetic polymer may include polyurethane, polyamide resin, vinyl chloride resin, acrylic resin, acrylonitrile-butadiene rubber (ABR) and styrene-butadiene rubber (SBR). The coagulation solution may includes water, a mixture of dimethylformamide and water and an aqueous solution of an inorganic salt (such as sodium chloride, Glauber's salt and ammonium sulfate).

For example, rayon fibers are cut to approximately 50 mm long, a web being formed by curding. The web is then needle punched to prepare a three-dimensionally intertwined nonwoven fabric (1 mm thick, basis weight 300 g/cm², SMD value 4 microns by KES-FB series). Furthermore, on both surfaces thereof, a resin solution consisting of 50 parts by weight of an acrylic resin, Rikitack K, (made by Dairiki Co., Ltd.), 20 parts by weight of an acrylic resin, XE-3773A (made by Negami Kagaku Co., Ltd.) and 30 parts by weight of dimethylformamide is coated by a reverse roll coater. The fabric is then immersed in water to coagulate it. After it is washed and dried, the adhesive double coated sheet is stuck on the endless metal belt 7. In this case, a printed product of high quality can be obtained in which no unevenness is formed on the surface. No unevenness is formed on the surface of the continuous web 8 stuck to it so that a uniform printing can be made.

The adhesion can be restored by washing the adhesion portion of the endless belt 7 from which the continuous web 8 was peeled off and removing the fluff, the dust and others. For the purpose, as shown in FIG. 1, a pair of draining rollers 7a are disposed between the endless belts 7. A roll brush 7b abuts to the endless belts 7. In addition, a tray 7c is provided for storing the washing water. The brush 7b is rotated to scrape away fluffs adhered on the adhesive portion of the endless belts 7 when washing. The roller 7a is adapted to remove water and moisture adhered to the endless belts 7.

Figure 19:
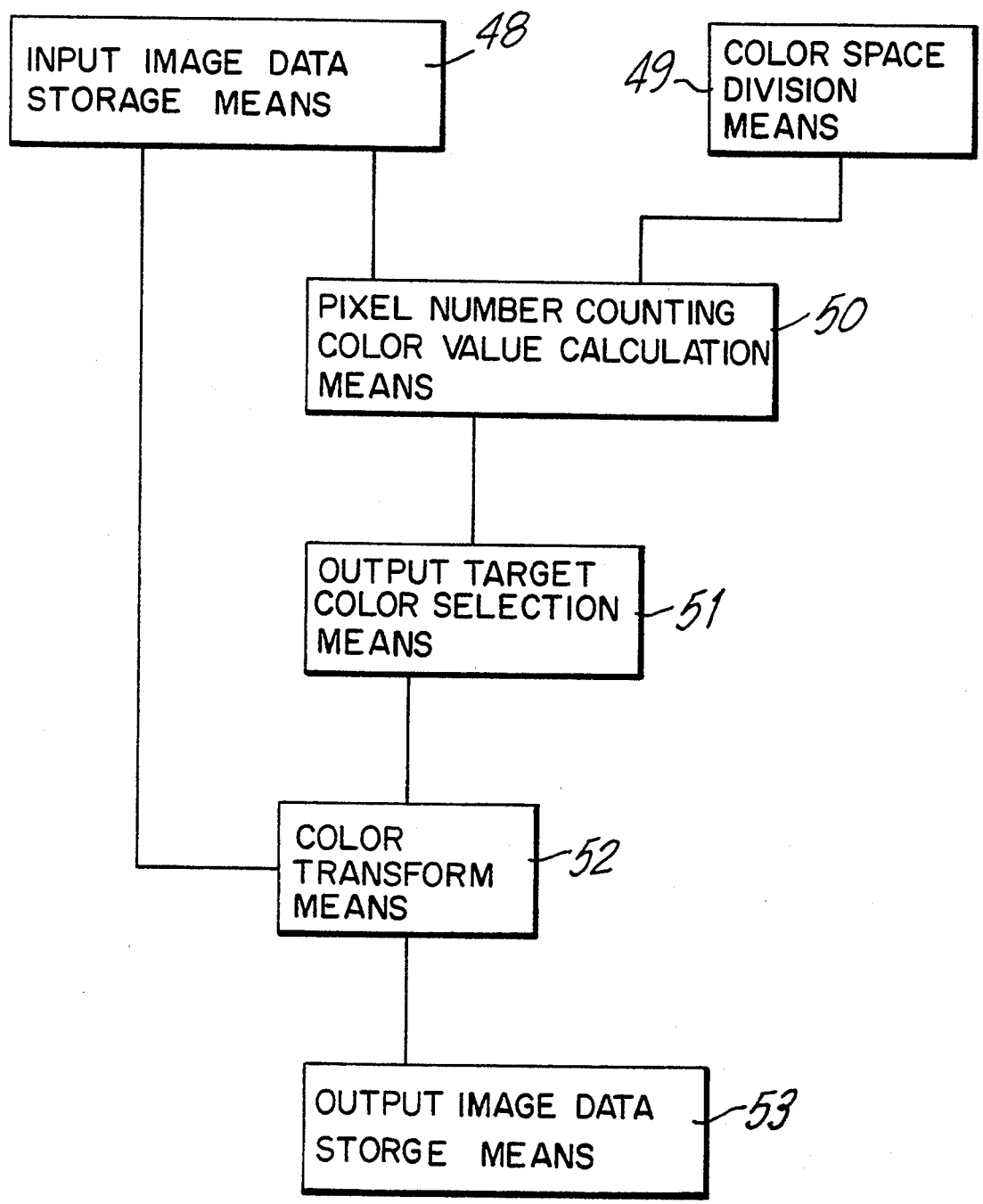
FIG. 19 is a block diagram showing the principle-oriented arrangement of a color transform device.

In this embodiment, a color transform device transforms an input image read by a digital image input device, which contains numerous kinds of colors to an output image containing smaller kinds of colors to be output to digital image output devise connected to the ink jet head 3. FIG. 19 is a block diagram showing the principle-oriented arrangement of the color transform device. In the color transform device shown in FIG. 19, digital image data of the input image read by the digital image input device such as an image scanner are stored in input image data storage means 48. Color space division means 49 equally divides each axis of a three-dimensional RGB color space into n sections so as to divide the color space into $n^3$ unit cubes (spaces). Pixel number counting/color value calculation means 50 counts the number of pixels contained in each unit cube of the color space and calculates the color value for each unit cube, based on the image data of the input image stored in the input image data storage means 48. In this case, the color value is defined as an RGB value representative of each unit cube, for example, a mean value, a weighed average and so on of the RGB values of the pixels contained in the unit cube. Output target color selection means 51 selects predetermined m unit cubes in descending order of the number of pixels contained therein, and sets selected color values of the respective unit cubes as output target colors. Color transform means 52 calculates distances between the output target colors in the color space and colors of the pixels of the input image stored in the input image data storage means 48, and selects an output target color from the output target colors positioned at the shortest distance from a color of the each pixel for each pixel and replaces the color of the each pixel with the selected output target color. Output image data storage means 53 stores the image data of the input image replaced with the output target colors.

Figure 20:
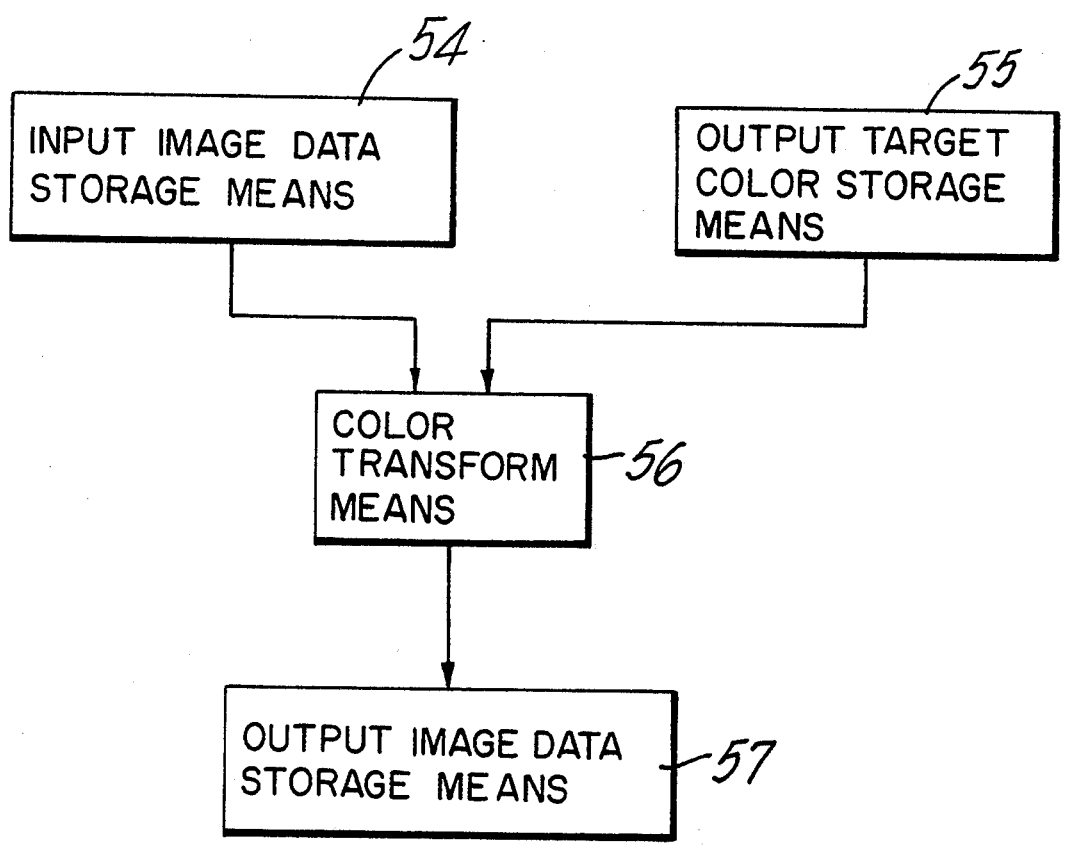
FIG. 20 is a block diagram showing the principle-oriented arrangement of another color transform device.

According to the above-mentioned construction, the output target colors can be automatically selected, while in the case of manually selecting the output target colors, a color transform device shown in FIG. 20 is preferable. In the color transform device, Input image data storage means 54 stores digital image data of an input image read by a digital image input device and output target color storage means 55 stores output target colors. Color transform means 56 selects the output target color in a three-dimensional RGB color space for each pixel of the input image stored in the input image data storage means 54 and replaces a color of the pixel with the selected output target color. Output image data storage means 57 stores the image data of the input image replaced with the output target colors.

Figure 21:
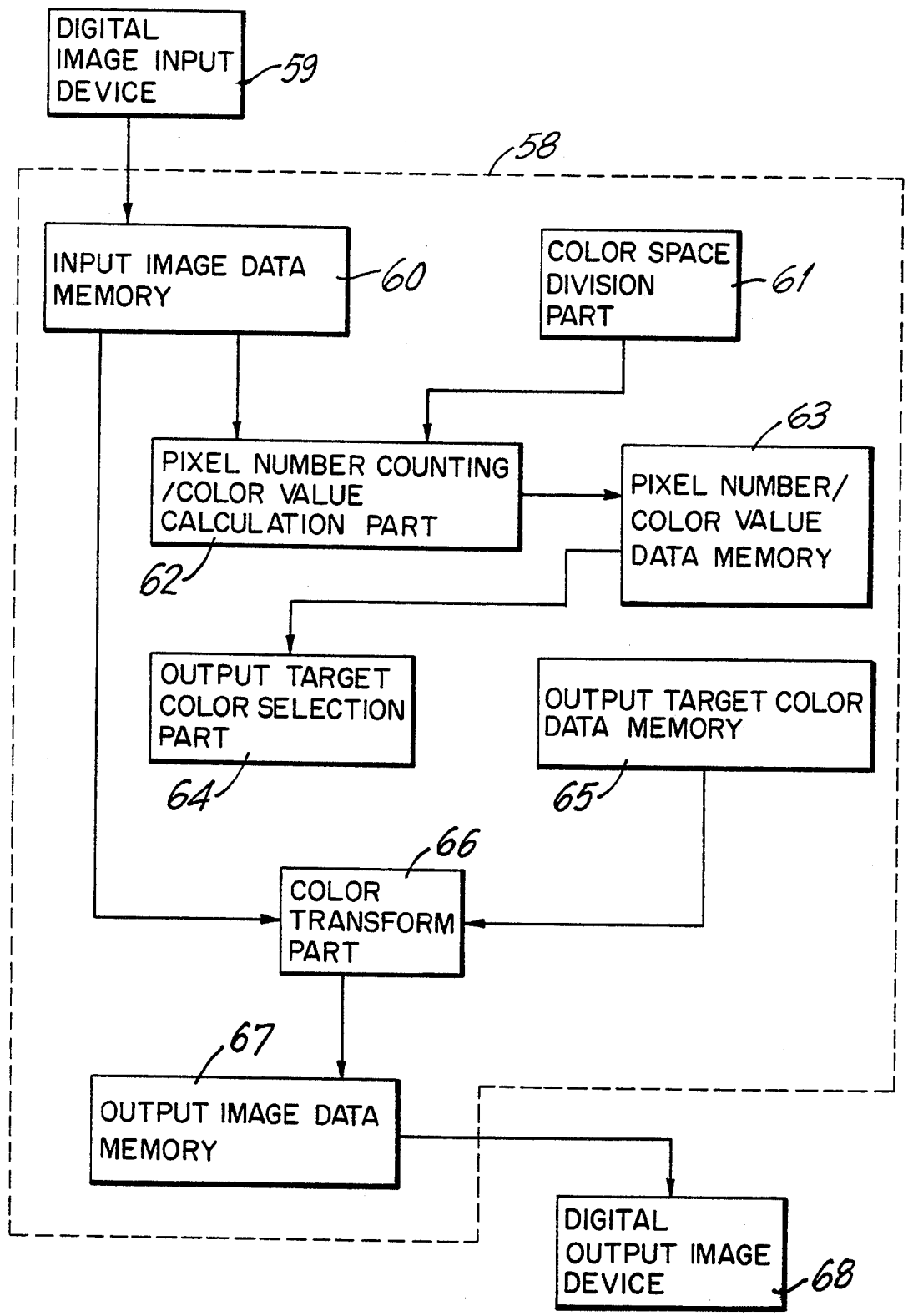
FIG. 21 is a block diagram showing the concrete arrangement of the color transform device.
Figure 22:
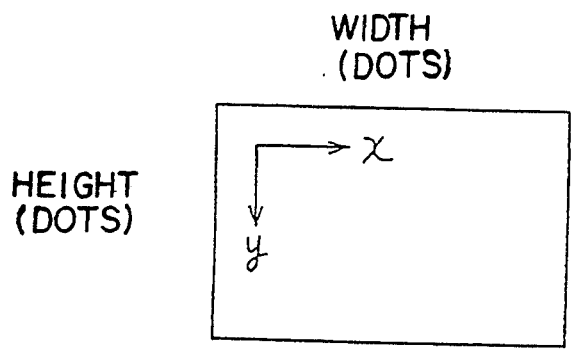
FIG. 22 is a diagram for explaining image data for an input image in the color transform device of FIG. 21.
Figure 28:
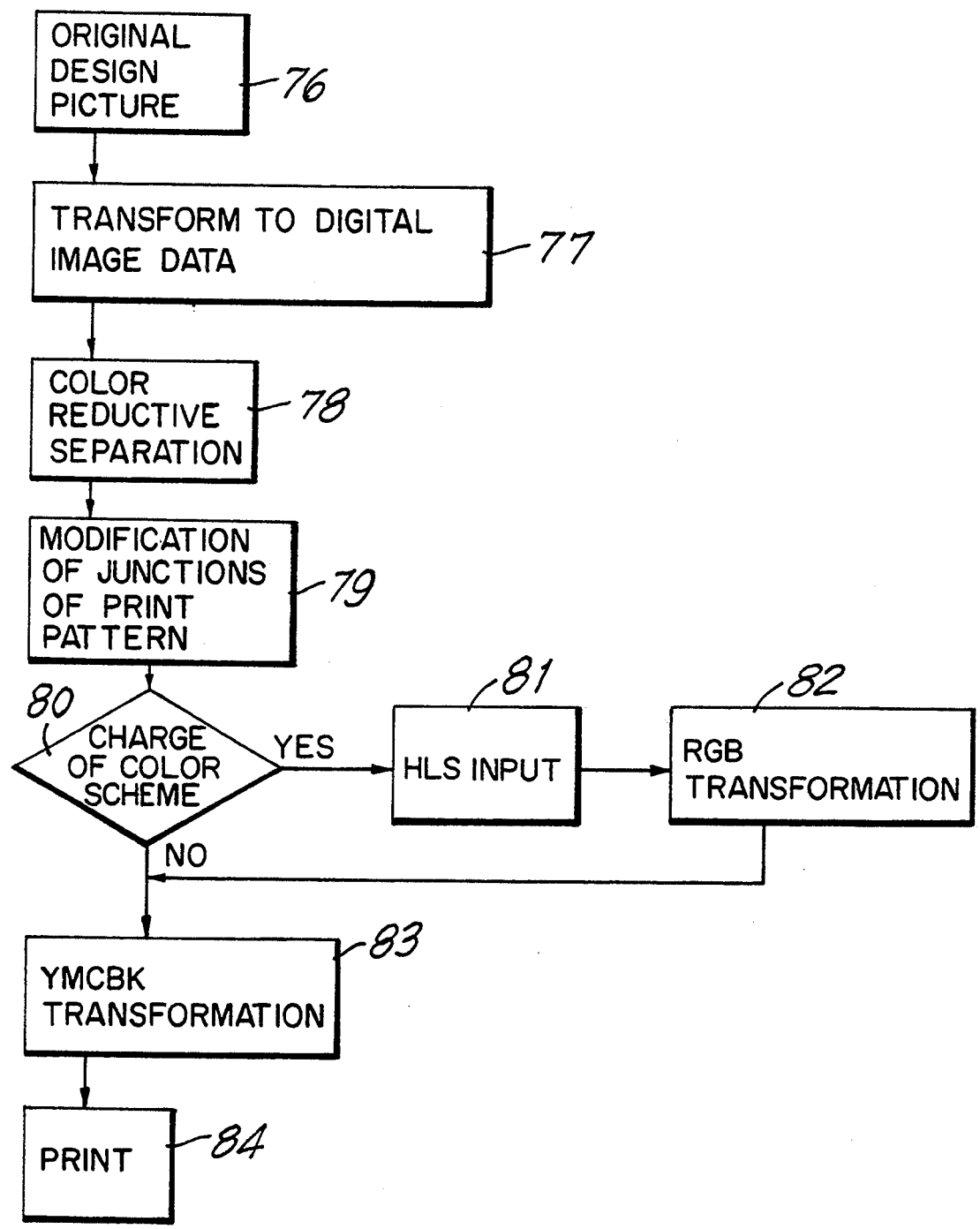
FIG. 28 is a flow chart showing the principle arrangement of a printing system having a color transform device applied thereto.

FIG. 21 is a block diagram showing the arrangement of the embodiment of the color transform device. FIG. 28 is a block diagram showing the principle-oriented arrangement of a printing system.

A digital image input device 59 shown in FIG. 21 transforms an original design picture into digital image data (Blocks 76 and 77 in FIG. 28). The digital image input device 59 comprising of an image scanner transforms the original color design picture into digital image data, for example, in this embodiment, with 256 gradations for each of R, G, B ($256^3$ colors) and reads these digital image data.

The digital image data of the input image read by the digital image input device 59, for example, as shown in FIG. 2, comprises a width and a height which consist of the predetermined number of pixels (dots). In the following explanation, a color data of a pixel positioned at a point (x,y) on the image data is represented as ($R_{xy}$, $G_{xy}$, $B_{xy}$).

The image data read by the digital image input device 59 are stored in an input image data memory 60 of the color transform device 58.

Figure 23:
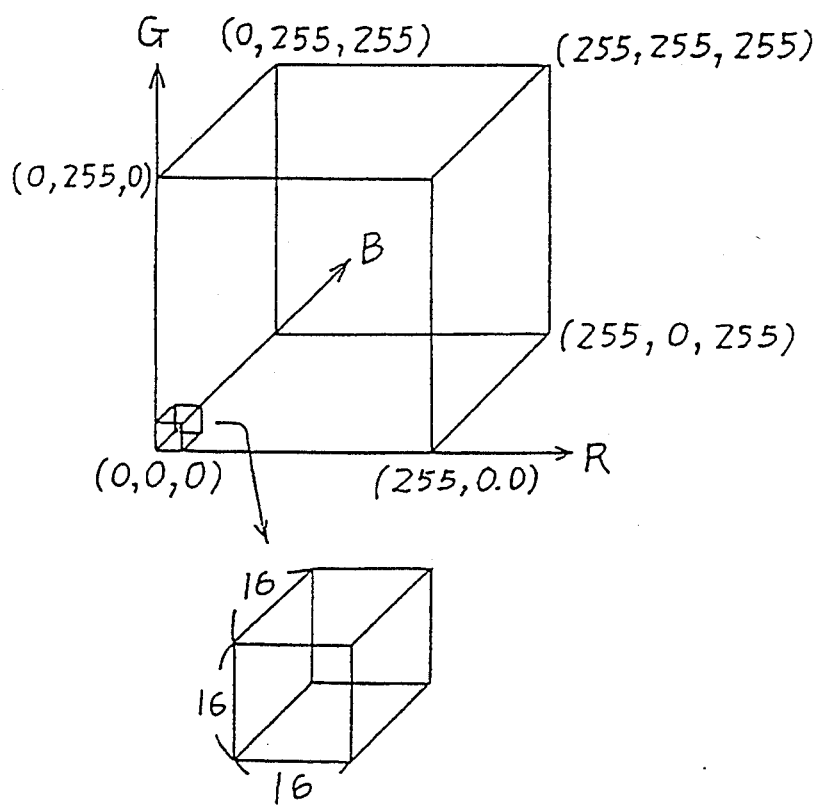
FIG. 23 is a diagram for explaining the division of three-dimensional RGB color space in the color transform device of FIG. 21.

A color space division part 61, as shown in FIG. 23, divides each axis of a three-dimensional RGB color space into 16 areas each of which consists of 16 gradations so as to divide the color space into $16^3 = 4096$ unit cubes.

A pixel number counting/color value calculation part 62 counts the number of pixels contained each unit cube of the color space and calculates color value for each unit cube and stores the number of pixels together with the color value of each unit cube in a pixel number/color value data memory 63.

An output target color selection part 62, based on the data stored in the pixel number/color value data memory 63, selects predetermined m unit cubes in descending order of the number of pixels contained therein and stores the color values of the selected unit cubes as the output target colors in an output target color data memory 65.

A color transform part 66 calculates distances between the output target colors in the color space and colors of the pixels of the input image stored in the input image data memory 60, selects an output target color from the output target colors positioned at the shortest distance from a color of the each pixel and replaces the color of the each pixel with the selected output target color.

This operation will be explained in more detail.

A distance between a pixel positioned at a point (x,y) on an image data and a j-th output target color ($1 \leq j \leq m$), designated as $D_{xy,j}$, is defined as $$D_{xy,j} = ((R_{xy}-R_j)^2 + (G_{xy}-G_j)^2 + (B_{xy}-B_j)^2)^{\frac{1}{2}}.$$

If the minimum value of $D_{xy,1} \sim D_{xy,m}$ is assumed to be $MIN(D_{xy})$, then the pixel (x,y) is replaced with the output target color defined as $$MIN(D_{xy}) = D_{xy,j}(1 \leq j \leq m).$$

The aforementioned operation is repeated for all pixels of the input image.

An output image data memory 67 stores the image data of the input image replaced with the output target colors. Thus a color reduction separation is performed by the color transform device 58 (Block 78 in FIG. 10), and the output image data stored in the output image data memory 67 is output to an appropriate digital image output device, for example, in this embodiment, a color CRT display device. Namely, in this embodiment, a print pattern based on the original design picture is displayed on the CRT display device 68.

According to the color transform device 58, even though the input image includes numerous kinds of colors and a pattern is complex, an output image more approximate to the input image can be displayed on a color CRT display device. Moreover, color reproducibility of an input image with respect to an image displayed on a color CRT display device is further improved because larger kinds of of colors are available for generation of the output image.

Then the print pattern displayed on the CRT display device 68 is modified. This modification is performed an image modification device provided with various drawing functions.

The print pattern, for example, as shown in FIG. 27, is continuous in a certain regularity. FIG. 27(A) is a view showing a print pattern in a step feed operation, while FIG. 27(B) is a view showing a print pattern in a half feed operation. Consequently, there is a possibility that adjacent patterns fail to conform with each other at junctions in the print pattern. This unconformity is modified (Block 79 in FIG. 28). Color scheme can be changed into arbitrary colors by assigning hue (H), lightness (L) and saturation (B) to each output target color (Blocks 80 and 81 in FIG. 28). Input H, L and S are transformed to an RGB signal and displayed on the CRT display device 68 (Block 82 in FIG. 28). Based on the image data modified in such a manner, a printing is applied on a fabric by an ink jet printer (Block 84 in FIG. 28).

In this case, the respective RGB signals of output target colors are transformed to YMCBk signals for printer output (Block 83 in FIG. 28). In the printing, there are various materials to be applied with the printing, for example, cotton, silk and synthetic fiber and so on, so that there is a possibility of using different combinations of dyes according to a kind of material. Then in each combination of dyes, a representative colors are previously selected in the color space and a look-up table for transformation between the RGB signals and the YMCBk signals is generated so as to conform each representative color displayed on a CRT display device with that output on fabric. According to this manner, desired colors can be output by changing the look-up table in any combination of dyes. The transformation between the RGB signals and the YMCBk signals is performed according to the selected look-up table, but an interpolating operation achieves an output of any color not found in the look-up table.

In the above-mentioned color transform device 58, the output target colors are automatically selected. On the contrary, a color transform device, which will be explained below, is adapted to manually select the output target colors.

Figure 24:
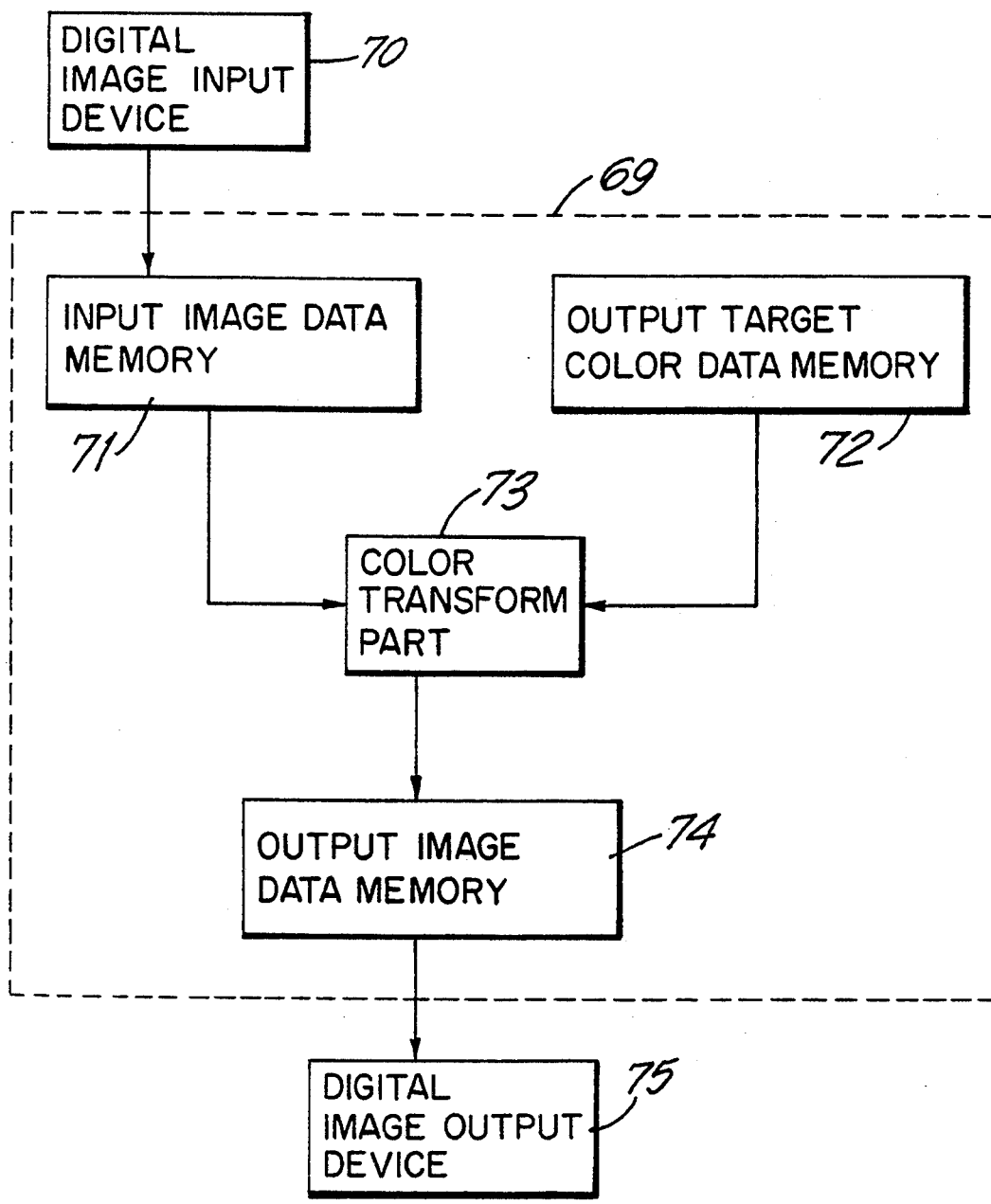
FIG. 24 is a block diagram showing a color transform device according to another embodiment.

FIG. 24 is a block diagram showing an arrangement of a color transform device adapted for manual selection of output target colors.

In FIG. 24, a digital image input device 70, which is similar to that shown in FIG. 21, transforms an original design picture and the like to digital image data, for example, with 256 gradations for each of R, G, B ($256^3$ colors) and reads these image data.

The image data of the input image read by the digital image input device 70 are stored in an input image data memory 71 of the color transform device 69.

In this color transform device 69, output target colors are manually input beforehand and stored in an output target color data memory 72.

A color transform part 73 calculates a distance to each output target color with respect to each pixel of the input image in three-dimensional RGB color space each axis of which comprises 256 gradations, and select the output target color positioned the nearest to the pixel, and replaces a color of the pixel with the selected output target color. The distance calculating operation is similar to that of the embodiment shown in FIG. 21.

Then an output image data memory 74 stores the image data of the input image replaced with the output target color. The obtained output image data are transferred to an appropriate digital image output device 68.

According to this color transform device 69, there can be obtained the same result as that of the embodiment shown in FIG. 21 except for manually selecting the output target colors.

In a color transform device, there is a possibility that a transformation error or a noise may occur in an output image, depending on a construction of an original design picture. For example, as shown in FIG. 25, in the case of using an original design picture in which a red flower and a pink flower adjacent to one another are positioned in white background, an outline of the red flower may be transformed red to pink in the output image.

Such transformation error can be eliminated by selecting an area centering around the pixel erroneously transformed and containing predetermined number of pixels, setting a weighting factor of distance for a position of each pixel in this area, and then performing color transformation. Thus, as shown in FIG. 26, for example, an area centering around the pixel erroneously transformed (hatched in FIG. 26) and containing 5 dots×5 dots (25 pixels) is selected and a weighting factor 6 is set for the erroneously transformed pixel, a weighting factor 5 is set for pixels neighboring above and blow, right and left the erroneously transformed pixel and a weighting factor 4 is set for pixels obliquely neighboring the erroneously transformed pixel and so on. Then the weighted distances between the erroneously transformed pixel and other pixels are calculated and a color of the erroneously transformed pixel is replaced with a color of the pixel having the minimum distance to the erroneously transformed pixel.

Figure 29:
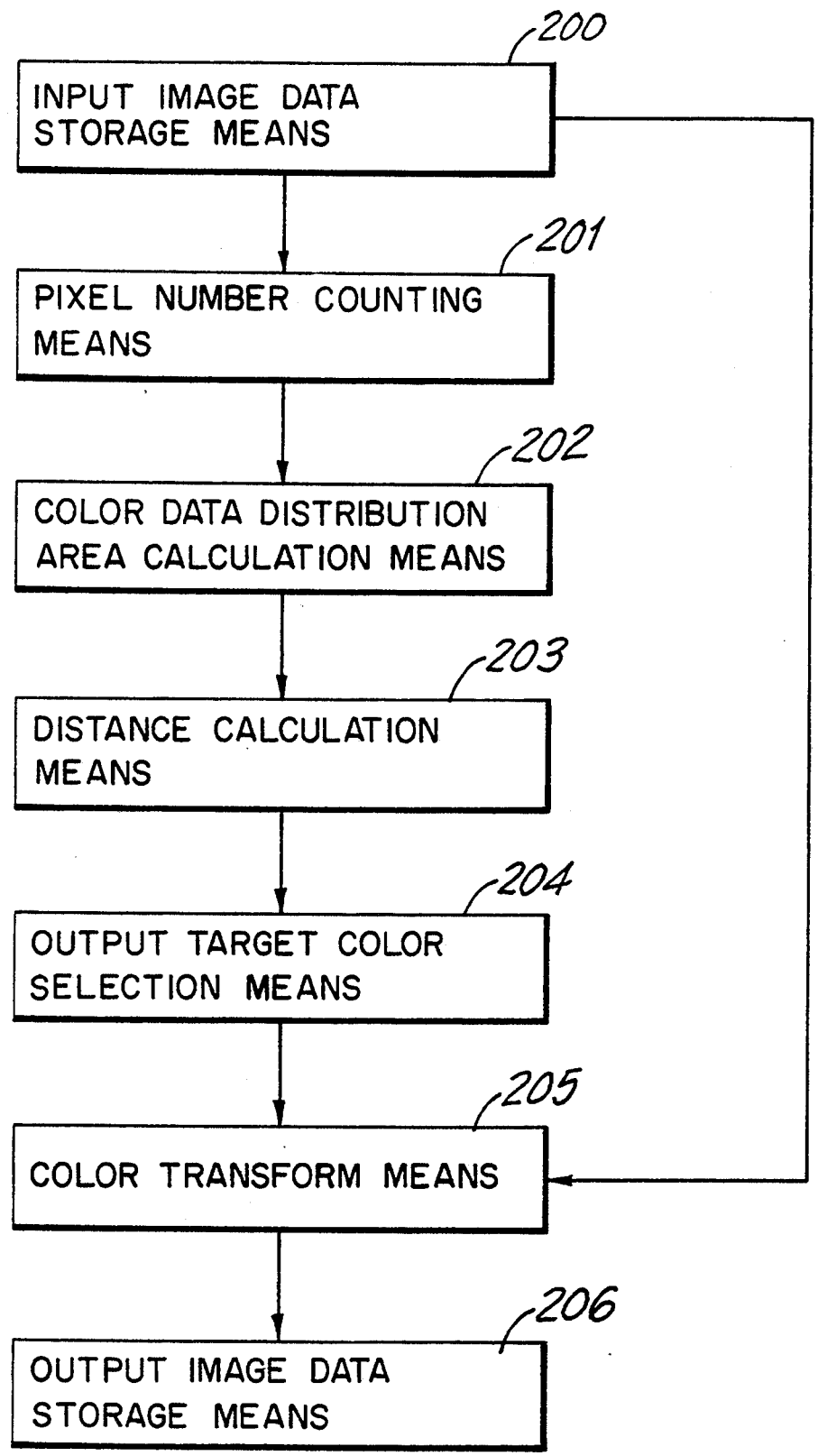
FIG. 29 is a block diagram showing the principle-oriented arrangement of the other color transform device.
Figure 30:
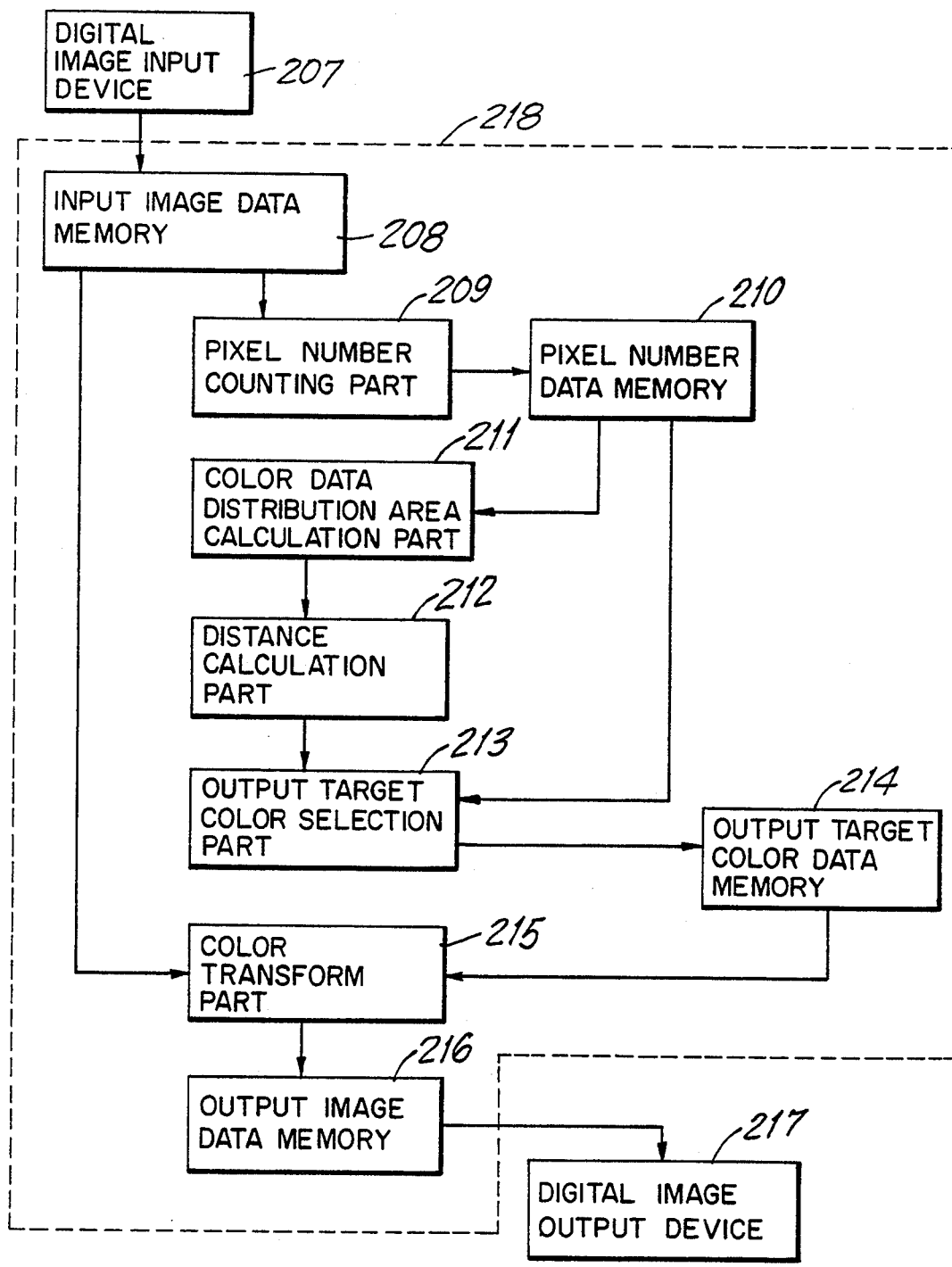
FIG. 30 is a block diagram showing the concrete arrangement of the other color transform device.

There can be also provided a color transform device shown in FIGS. 29 and 30. FIG. 29 is a block diagram showing the principle-oriented arrangement of this color transform device and FIG. 30 is a block diagram of a concrete arrangement thereof. This color transform device 218 is identical with the above-mentioned color transform device 58 except for pixel number counting means 201, color data distribution area calculation means 202, distance calculation means 203 and output target color selection means 204. Therefore the same elements as those of the color transform device 58 would not be described in detail in the following explanation.

In the above-mentioned color transform device 58, a three-dimensional RGB color space is equally divided into subspaces and a mean value of color data contained in the divided subspace is set as a color value of the divided subspace and m divided subspaces are selected in descending order of the number of pixels thereof and color values of the selected m subspaces are set as output target colors and color transformation of each pixel is performed based on these output target colors. Hence there is a possibility that the output target colors fail to uniformly distribute overall area in color data distribution area occupied the three-dimensional RGB color space. In this case, with respect to a pixel positioned away at a great distance from the output target color designated at color transformation, it is difficult to transform the pixel into color data approximate to the original color data thereof.

Therefore the color transform device 218 is intended to set output target colors overall color data distribution area occupied the three-dimensional RGB color space.

Pixel number counting means 201 counts the number of pixels having the identical color data (RGB values) and a pixel number counting part 209 generates a three-dimensional RGB histogram from color data stored in an input image data memory 208 and counts the number of pixels in each color datum and stores the number of pixels in the pixel number data memory 210. Color data distribution area calculation means 202 determines a color data distribution area occupied the three-dimensional RGB color space and calculates a volume thereof. A color data distribution area calculation part 211 performs this operation. Distance calculation means 203 calculates a distance between the output target colors in order to set the output target colors overall color data distribution area and a distance calculation part 212 performs this operation. The distance calculation part 212 assumes that the output target colors are set for the center of m spherical spaces and calculates a radius of a spherical space in the case of densely arranging m spherical spaces in the color space. Concretely, the distance calculation part 212 calculates a radius of a sphere corresponding to a unit volume obtained by dividing a volume of the color data distribution area calculated by the color data distribution area calculation part 211 by m and set a distance between output target colors having a length twice as long as the radius. The output target color selection means 204 selects m color data as output target colors from color data stored in the image data memory 210 and an output target color selection part 213 performs this operation. The output target color selection part 213 selects a color data having the highest frequency among the color data stored in the pixel number data memory 210 as a first output target color, and eliminates color data belonging to a sphere which centers around the first output target color and has a radius corresponding to the distance between output target colors, and selects a color data having the highest frequency among the residual color data as a second output target color. Thereafter the output target color selection part 213 repeats this operation until the m-th output target color is obtained. If all of color data are eliminated before the m-th output target color is obtained, with respect to color data belonging to spaces formed by overlapping the respective spherical spaces centering around each output target color. Consequently, it is possible to set the output target colors overall color data distribution area. Thereafter the color data of each pixel are transformed by a color transform means 205 based on the output target colors.

Figure 31:
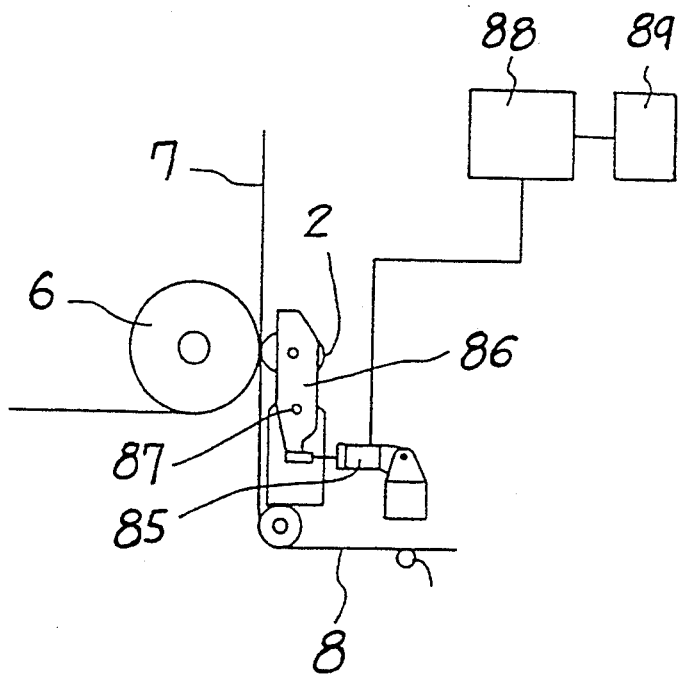
FIG. 31 is a side view showing the drive mechanism for the press roller of FIG. 1.

As shown in FIG. 31, the printing apparatus has a drive means consisting of an air cylinder 85. The both ends of the press roller 2 are mounted on a pair of levers 86 for rotation, the lever 86 being supported by a supporting shaft 87. The air cylinder 85 is adapted to move the press roller 2 and connected to the lever 86. The lever 86 can be operated by the air cylinder 85 to rockingly move the lever 86 and the press roller 2 about the supporting shaft 87 so that the press roller 2 is advanced toward the endless belt 7 and pressed against the continuous web 8 on the endless belt 7. Accordingly, when the endless belt 7 is intermittently drive by the driving motor 9, the continuous web 8 is stuck on the endless belt 7 and intermittently transported by the endless belt 7. The lever 86 and the press roller 2 can be rockingly moved by the air cylinder 85 so that the press roller 2 is retracted from the endless belt 7 and spaced from the continuous web 8. Furthermore, this printing apparatus has a control device 88 which controls the driving motor 9 and the air cylinder 85. The control device 88 is connected to the ink jet head 3, the drive motor 9, the air cylinder 85 and the timer 89.

In this printing apparatus, when the endless belt 7 is intermittently driven by the drive motor 9, the press roller 2 is pressed against the continuous web 8 so that the continuous web 8 is stuck on the endless belt 7 and intermittently transported by the endless belt 7. At the same time, the digital image data is sent to the ink jet head 3 and processed in the ink jet head 3. The drive motor 9 is controlled by the control device 88 so that when the endless belt 7 and the fabric 1 are stopped, the timer 89 is driven by the signal from the control device 88. After the set period of the timer 89 has passed, the air cylinder 85 is controlled by the control device 88 so that the press roller 2 is retracted from the endless belt 7 and spaced from the continuous web 8.

After the endless belt 7 is stopped and the digital image data is processed, based on the signal of the control device 88, the ink jet head 3 runs widthwise of the continuous web 8 and the ink is injected from the ink jet head 3 to the continuous web 8. Furthermore, after the ink jet head 3 runs, the cylinder 85 is controlled by the control device 88 so that the press roller 2 is advanced toward the endless belt 7 and is pressed against the continuous web 8. Thereafter, the drive motor 9 is controlled by the control device 88 so that the endless belt 7 is driven again and the continuous web 8 is intermittently transported by the endless belt 7. These procedures are alternately repeated successively and the continuous web 8 is printed.

Therefore, in this printing apparatus, after the endless belt 7 is stopped, the press roller 2 is spaced from the continuous web 8. Before the endless belt 7 is driven again, the press roller 2 is pressed against the continuous web 8. Therefore, during the endless belt 7 is stopped, the press roller 2 is not pressed continuously so that no streak is formed on the continuous web 8 by the press roller 2. Therefore, there is no possibility that the streak of the continuous web 8 affects the penetrating of the ink.

In this embodiment, the lever 86 and the press roller 2 are rockingly moved by the air cylinder 85. However, any member other than the lever 86 can be used as the supporting member of the press roller 2 to support the press roller 2 on the supporting member. Any member other than the air cylinder 85 can be used as the drive means for the press roller 2 to connect it to the supporting member of the press roller 2 so that the supporting member and the press roller 2 are moved by the drive means.

Figure 32:
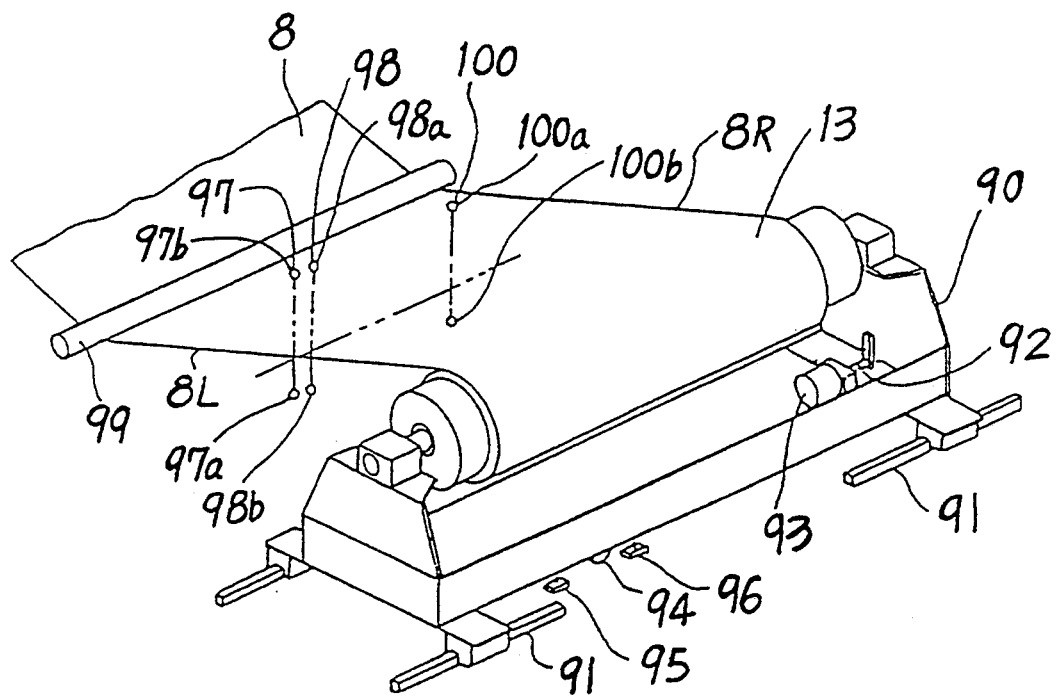
FIG. 32 is a perspective view of a meandering correcting device.

As to the roll 13 of the continuous web 8, as shown in FIG. 32, its frame 90 is supported by rails 91 for movement. A screw rod 92 is connected to the driving motor 93 and screwed to the frame 90. The drive motor 93 and the screw rod 92 is adapted to move the continuous web 8 and the frame 90 to correct meandering of the continuous web 8. Furthermore, a projection 94 is provided on the frame 90, a pair of limit switches 95 and 96 being arranged and fixed on both sides thereof. The limit switches 95 and 96 are used for detecting the projection 94 of the frame 90 and limiting the movement of the frame 90.

Furthermore, two pairs of photoelectric sensors 97 and 98 are used as the edge sensors. In the transporting path of the continuous web 8, each sensors 97 and 98 are disposed between the roll 13 and the dust-collecting roller 99. The continuous web 8 has the opposite edges 8L and 8R. Near one edge 8L, each sensors 97 and 98 are spaced to each other widthwise of the continuous web 8. The photoelectric sensor 97 is positioned outside of the edge 8L, while the photoelectric sensor 98 is positioned inside of the edge 8L. The photoelectric sensor 97 is of light transmission type and consists of a projector 97a and a receiver 97b. The projector 97a is positioned below the continuous web 8, while the receiver 97b is positioned above the continuous web 8. The photoelectric sensor 98 is also of light transmission type and consists of a projector 98a and a receiver 98b. The projector 98a is positioned below the continuous web 8, while the receiver 98b is positioned above the continuous web 8. Therefore, when the continuous web 8 meanders, the edge 8L of the continuous web 8 can be detected by the photoelectric sensors 97 and 98.

Furthermore, the apparatus has a web sensor for detecting the presence of the continuous web 8. In this embodiment, a photoelectric sensor 100 is used as the web sensor. In the transporting path of the continuous web 8, the photoelectric sensor 100 is disposed at a position corresponding to the photoelectric sensors 97 and 98 and arranged near the center of the continuous web 8. The photoelectric sensor 100 is also of light transmission type and consists of a projector 100a and a receiver 100b. The projector 100a is positioned above the continuous web 8, while the receiver 100b is positioned below the continuous web 8. Therefore, the presence of the continuous web 8 can be detected by the photoelectric sensor 100.

In this apparatus, if the continuous web 8 meanders when the continuous web 8 is delivered from the roll 13 and transported, the edge 8L of the continuous web 8 is detected by the photoelectric sensors 97 and 98 and the detecting signal is sent to the control device. Furthermore, the drive motor 93 is driven by the control device in response to the detecting signal of the photoelectric sensors 97 and 98, so that the screw rod 92 is rotated by the drive motor 93. Therefore, the screw rod 92 acts on the frame 90 so that the roll 13 and the frame 90 are slidingly moved along the rails 91 widthwise of the continuous web 8 to correct the meandering of the continuous web 8.

When the meandering is corrected, the edge 8L of the continuous web 8 is detected by the photoelectric sensors 97 and 98. The drive motor 93, the roll 13 and the frame 90 stop at that position. Furthermore, when the frame 90 is slidingly moved along the rails 91 and the projection 94 reaches the position of the limit switches 95 and 96, it is detected by the limit switches 95 and 96, the detecting signal being sent to the control device so that the drive motor 93 is stopped.

Furthermore, at the same time, the presence of the continuous web 8 is detected by the photoelectric sensor 100 and the detecting signal is sent to the control device. When each sensors 97, 98 and 100 malfunction, the malfunction is judged by the combination of the detecting signals of each sensors 97, 98 and 100. The alarm lamp is controlled by the control device and lit. The combination of the detecting signals is shown in FIG. 33.

In the table of FIG. 33, as shown in the top column, when each sensors 97, 98 and 100 are in light transmitting condition (0), it means the continuous web 8 is absent. Therefore, the alarm lamp is controlled by the control device and lit. The alarm lamp shows that the continuous web 8 is absent. As shown in the next column, when the photoelectric sensors 97 and 98 are in light transmitting condition (0) and the photoelectric sensor 100 is in light shading condition (1), it means that the photoelectric sensor 98 or the photoelectric sensor 100 malfunctions. It is shown by the alarm lamp. As shown in the next column, when the photoelectric sensor 97 is in light transmitting condition (0) and the photoelectric sensors 98 and 100 are in light shading condition (1), it means that the continuous web 8 does not meander. Accordingly, the continuous web 8 is transported continuously.

Furthermore, when the photoelectric sensor 97 is in light shading condition (1) and the photoelectric sensors 98 and 100 are in light transmitting condition (0), when the photoelectric sensors 97 and 100 are in light shading condition (1) and the photoelectric sensor 98 is in light transmitting condition (0) and when the photoelectric sensors 97 and 98 are in light shading condition (1) and the photoelectric sensor 100 is in light transmitting condition (0), they mean that the photoelectric sensor 97, the photoelectric sensor 98 or the photoelectric sensor 100 malfunctions. It is shown by the alarm lamp. When each sensors 97, 98 and 100 are in light shading condition (1), it means the continuous web 8 meanders. Therefore, the meandering of the continuous web 8 is corrected by the control device and the drive motor 93. When the limit switches 95 and 96 are on, the drive motor 93 is controlled by the control device and stopped as described above.

Therefore, the malfunctions of each sensors 97, 98 and 100 can be judged by the combination of the detection signals of each sensors so that the alarm lamp is lit by the control device to alarm any abnormality. Therefore, when each sensors 97, 98 and 100 malfunction, it can be surely countermeasured.

Figure 34:
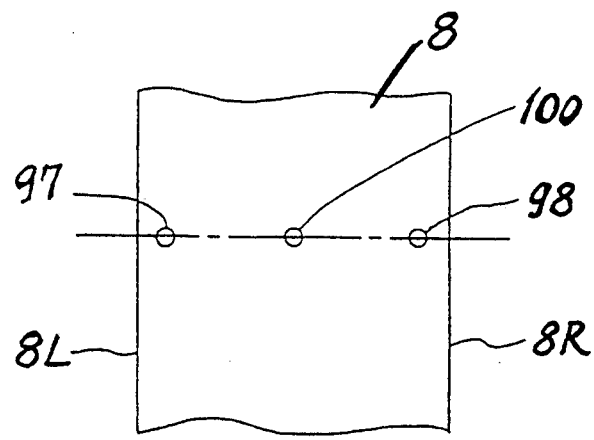
FIG. 34 is an explanatory view of another embodiment of the device of FIG. 32.
Figure 35:
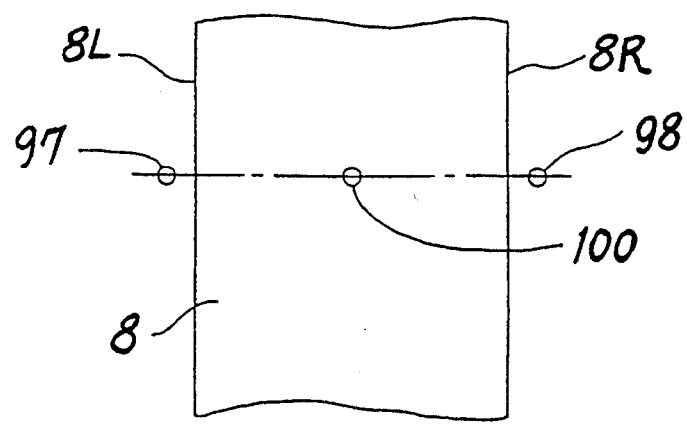
FIG. 35 is an explanatory view of the other embodiment of the device of FIG. 32.

In this embodiment, the photoelectric sensors 97 and 98 are disposed near the edge 8L of the edges 8L and 8R of the continuous web 8 and the edge 8L is detected by the photoelectric sensors 97 and 98. However, as shown in FIG. 34, each sensors 97 and 98 may be disposed near each edges 8L and 8R and positioned their inside so that each edges 8L and 8R are detected by each sensors 97 and 98 to correct meandering of the continuous web 8. As shown in FIG. 35, each sensors 97 and 98 may be also disposed outside of each edges 8L and 8R.

The edges 8L and 8R of the continuous web 8 may be also detected by an image sensor in place of the photoelectric sensors 97 and 98. It can be also considered to use sensors of other types as the edge sensor. An alarm device such as an alarm buzzer can be used in place of the alarm lamp.

As to the continuous web 8 of the roll 13, several pieces of continuous web 8 are sewed each other and patched together and it is delivered from the roll 13 and transported intermittently to the ink jet head 3. Therefore, as shown in FIG. 36A, the continuous web 8 has several seams 101. The seam 101 extends widthwise of the continuous web 8 and rises in the direction of thickness thereof. Based on it, in the transporting path of the continuous web 8, a pair of seam-detecting devices 102a and 102b are disposed upstream of the ink jet head 3, positioned between the ink jet head 3 and the press roller 2 and spaced to each other widthwise of the continuous web 8. The detecting device 102a and 102b are used for detecting the seam 101 of the continuous web 8 and are of touch lever type, light reflection type or light transmission type. The constitution of the detecting devices 102a and 102b themselves is well known and hence its description will be omitted.

In this printing apparatus, when the continuous web 8 is transported intermittently by the endless belt 7 and, as shown in FIG. 36A and FIG. 36B, the seam 101 reaches the position of the detecting devices 102a and 102b, the seam 101 of the continuous web 8 is detected by each detecting devices 102a and 102b so that the detecting signal is sent to the control device. Though the seam 101 extends widthwise of the continuous web 8, it does not always extend straight. Rather, the seam 101 usually inclines toward the transporting direction of the continuous web 8 and extends obliquely to some extent. Therefore, the seam 101 of the continuous web 8 is first detected by one detecting device 102a. The seam 101 of the continuous web 8 is then detected by the other detecting device 102b. The ink jet head 3 and the endless belt 7 are controlled by the control device in response to the detecting signals of the detection devices 102a and 102b so that when the seam 101 of the continuous web 8 passes through the ink jet head 3, the ink jet head 3 does not run. The continuous web 8 is transported vacantly and not printed.

For example, after the seam 101 of the continuous web 8 is detected by one detecting device 102a, the scanning frequency n of the ink jet head 3 is counted by the control device. In this printing apparatus, at every time the continuous web 8 is intermittently sent, the ink jet head 3 scans widthwise of the continuous web 8. Accordingly, the scanning frequency is proportional to the transporting distance of the continuous web 8. Therefore, the transporting distance of the continuous web 8 can be measured by the scanning frequency n. Further, when the seam 101 of the continuous web 8 is detected by the other detecting device 102b before the scanning frequency n exceeds a set value N, thereafter the scanning frequency of the ink jet head 3 is counted by the control device to measure the transporting distance of the continuous web 8. As shown in FIG. 36C, when the scanning frequency reaches a set value F, the ink jet head 3 is controlled by the control device so that the ink jet head 3 stops at the stand-by position and is not driven. At the same time, the drive motor is driven by the control device, the continuous web 8 being continuously transported by the endless belt 7 and transported vacantly. During the continuous web 8 is transported vacantly, the ink jet head 3 does not scan and the continuous web 8 is not printed. As shown in FIG. 36D, after the continuous web 8 is started to be transported vacantly, the transporting distance is measured by the control device. When it reaches a set value G, the vacant-transporting condition is released. The continuous web 8 is again intermittently transported, the ink jet head 3 scanning again, so that the continuous web 8 is printed again.

The set values N, F and G are predetermined so that unless the scanning frequency n does not exceed the set value N during the period from the time the seam 101 of the continuous web 8 is detected by one detecting device 102a to the time the seam 101 of the continuous web 8 is then detected by the other detecting device 102b, the seam 101 does not reach the position 103 of the ink jet head 3 even if the scanning frequency of the ink jet head 3 reaches the set value F. Therefore, before the seam 101 of the continuous web 8 reaches the position 103 of the ink jet head 3, the continuous web 8 is transported vacantly by the endless belt 7. Even when the seam 101 of the continuous web 8 does not extend obliquely or extends obliquely to small extent and, in each detecting devices 102a and 102b, the seam 101 of the continuous web 8 is detected at the same timer the seam 101 then passes through the ink jet head 3 in a position 103 before the scanning frequency of the continuous web 8 reaches the set value F and the vacant-sending distance of the continuous web 8 reaches the set value G. Therefore, when the seam 101 of the continuous web 8 passes through the ink jet head 3, the ink jet head 3 does not scan. The continuous web 8 is transported vacantly and is not printed. Therefore, the seam 101 of the continuous web 8 does not contact to the ink jet head 3 so that the continuous web 8 is not contaminated. The ink jet head 3 is not clogged. The ink jet head 3 is not broken. After the seam 101 is passed through, the ink jet head 3 scans again and the continuous web 8 is again printed.

When the scanning frequency n of the ink jet head 3 exceeds the set value N after the seam 101 of the continuous web 8 is detected by one detecting device 102a, it means the continuous web 8 is transported by a set distance. If the seam 101 of the continuous web 8 is not detected by the other detecting device 102b even after the scanning frequency n of the ink jet head 3 exceeds the set value N, it means the other detecting device has a failure so that the seam 101 of the continuous web 8 is not detected even when the seam 101 of the continuous web 8 reaches the position of the detecting device 102b. Therefore, when the seam 101 of the continuous web 8 is not detected by the other detecting device 102b after the scanning frequency n of the ink jet head 3 exceeds the set value N, the endless belt 7 and the print unit 2 are controlled by the control device so that the endless belt 7, the continuous web 8 and the ink jet head 3 are temporarily stopped. Therefore, the seam 101 of the continuous web 8 does not contact to the ink jet head 3. Furthermore, at the same time, the alarm device is driven by the control device to alarm state of emergency. Therefore, a state of emergency can be surely countermeasured.

As to the set value N of the scanning frequency n, it is required that even if the seam 101 of the continuous web 8 extends obliquely to a large extent, after the seam 101 of the continuous web 8 is detected by one detecting device 102a, the seam 101 of the continuous web 8 is detected by the other detecting device 102b before the scanning frequency n of the ink jet head 3 exceeds the set value N. Therefore, it is required that the maximum oblique angle of the seam 101 is previously assumed and the set value N is predetermined in accordance therewith. The set values of F and G can be predetermined in accordance with the set value N.

Figure 37:
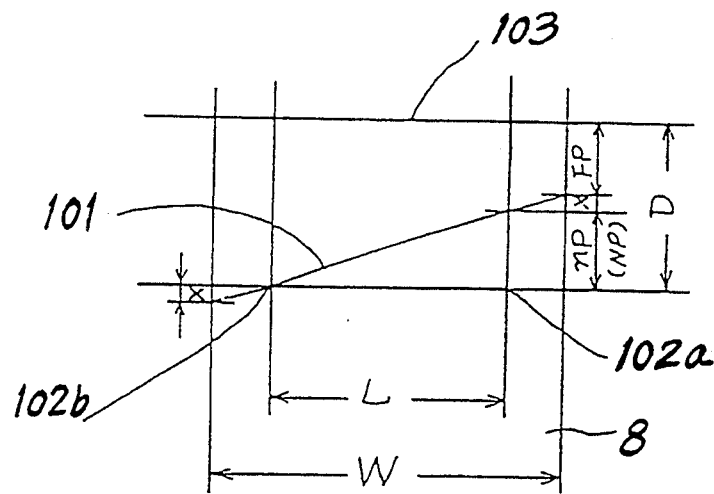
FIG. 37 is an explanatory view showing the seam in the continuous web passing by the detecting device and the ink jet head.

For example, when the maximum oblique angle of the seam 101 is assumed to be 30°, as shown in FIG. 37, the set value N can be derived from the distance L between the detecting devices 102a and 102b and the intermittent sending pitch P of the continuous web 8 as follows.

$$\tfrac{1}{3}^{\frac{1}{2}} = NP/L$$

$$N = L/3^{\frac{1}{2}}P$$

Furthermore, the set value F can be derived from the transporting distance D between the detecting devices 102a and 102b, the position 103 of the ink jet head 3 and the transporting distance x between the intersecting point of the detecting devices 102a and 102b against the seam 101.

$$F = (D - NP - x)/P$$

The transporting distance x can be derived from the width W of the continuous web 8 and the above-mentioned distance L.

$$x/[(W-L)/2] = \tfrac{1}{3}^{1/2}$$

$$x = (W-L) \cdot (2 \cdot 3^{\frac{1}{2}})$$

Therefore, the set value F can be finally derived by the following equation.

$$F = [D - NP - (W-L)/(2 \cdot 3^{\frac{1}{2}})]/P$$

The set value G can be also derived in the same manner as above.

$$G = D - FP + x = D - FP + (W-L)/(2 \cdot 3^{\frac{1}{2}})$$

In the embodiments of FIG. 36A to FIG. 36D, the continuous web 8 is transported vacantly by a fixed distance G even if the oblique angle of the seam 101 is small and the yield of the continuous web 8 is lowered. Therefore, as shown in FIG. 38A to FIG. 38D, based on the scanning frequency n of the ink jet head 3, the set scanning frequency F and the set vacant-transporting distance G are calculated by the calculating device 25 so that the set scanning frequency F is decreased and the set vacant-transporting distance G is increased when the oblique angle of the seam 101 is large and the scanning frequency n of the nozzle 1 is large. Contrary to it, the set scanning frequency F is increased and the set vacant-transporting distance G is decreased when the oblique angle of the seam 101 is small and the scanning frequency n of the nozzle 1 is small. In this case, the decrease in the yield of the continuous web 8 can be prevented.

In this case, the set value N is required to be predetermined so that the seam 101 of the continuous web 8 does not reach the position 103 of the ink jet head 3. It can be derived by the following equation.

$$NP/L = D/[(W+L)/2]$$

$$N = 2DL/[(W+L)P]$$

The set frequency F is a function f(n) of the scanning frequency n and derived by the following equation.

$$nP + x + f(n)P = D$$

$$x/[(W-L)/2[=nP/L$$

$$x=(W-L)N/(2L)$$

$$F=f(n)=D/P-(L+W)N/(2L)$$

The set vacant-transporting distance G is also a function g(n) of the scanning frequency n and can be derived by the following equation.

$$nP/L=g(n)/W$$

$$G=g(n)=PWn/L$$

As shown in FIG. 39A and FIG. 39B, the detecting devices 102a and 102b may be arranged near the position 103 of the ink jet head 3. In the embodiment, the seam 101 of the continuous web 8 is detected by one detecting device 102a, the continuous web 8 is transported vacant by the control device. When a fixed amount of the continuous web 8 is transported and the seam 101 passes through the ink jet head 3 after the seam 101 of the continuous web 8 is detected by the other detecting device 102b, the vacant transporting condition is released by the control device.

Figure 5:
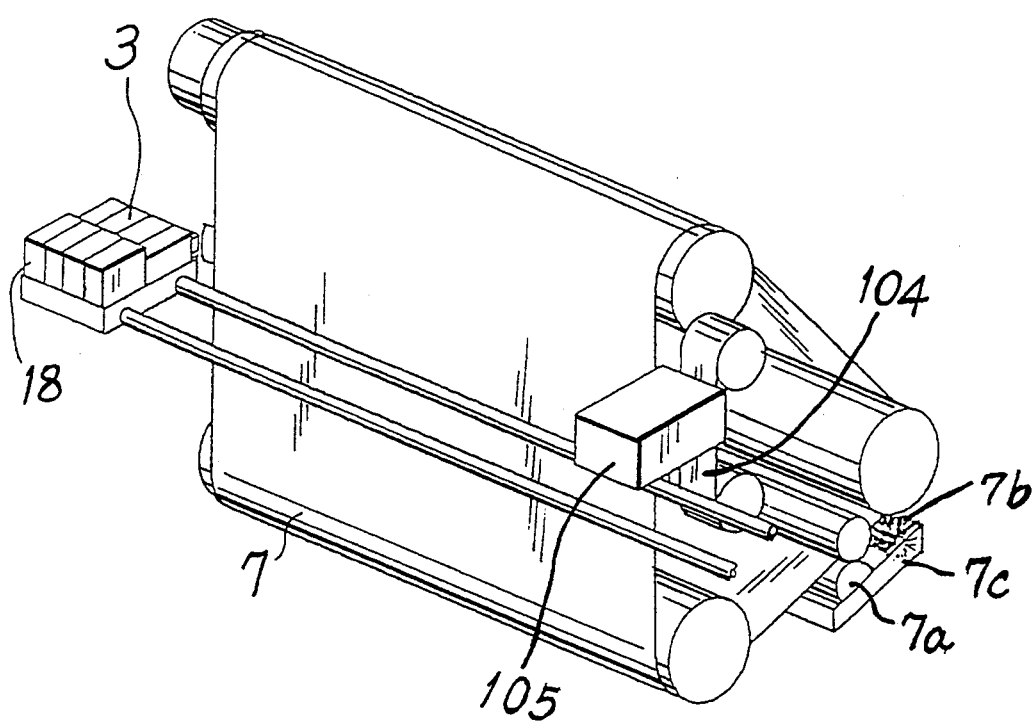
FIG. 5 is a perspective view showing a clogging detecting device seen in another direction.

Furthermore, as shown in FIG. 5, a clogging-detecting area is disposed beside the continuous web 8. A test web 104 is directed to the area, the ink drops being sprayed by the nozzle of the ink jet head 3 on a test web 104 in every scanning of the ink jet head 3 so that the test web 104 is printed. The surface of the test web 104 on which the ink has been sprayed is read optically by an image sensor 105 disposed in the clogging-detecting area.

Figure 40:
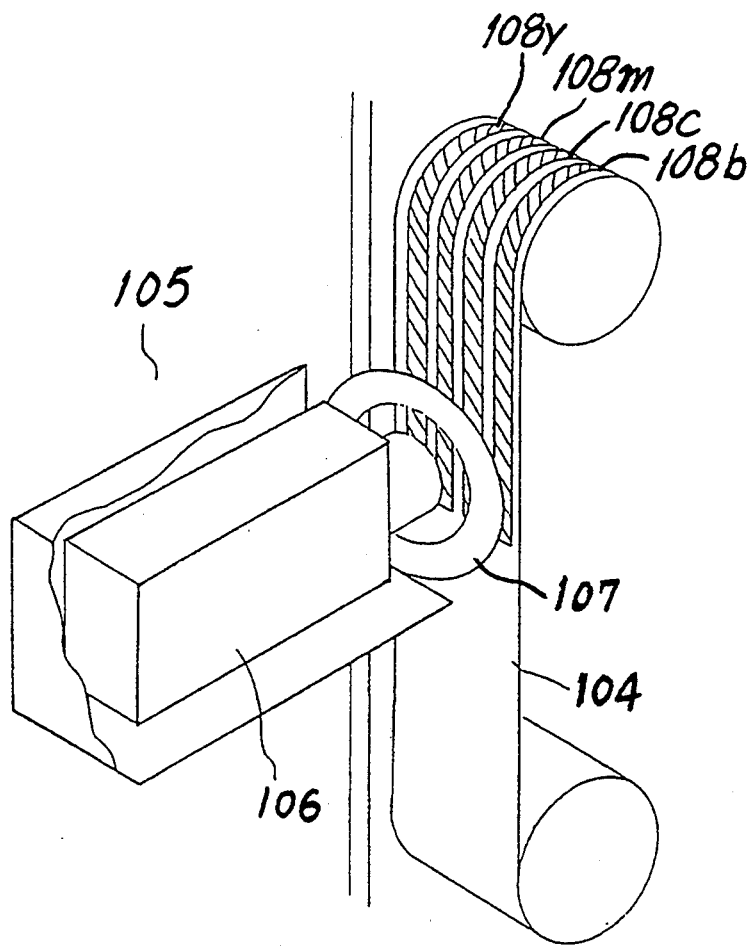
FIG. 40 is a perspective view of the principal portion of the clogging detecting device of FIG. 1.

The image sensor 105 is constituted by a CCD camera 106 and a light source 107 as shown in FIG. 40. In the image sensor 105, light receiving elements are arranged in four rows so that they can scan optically the yellow inked portion 108y, the magenta inked portion 108m, the cyan inked portion 108c and the black inked portion 108b respectively. The test web 104 is preferably of relatively high lightness such as white.

Figure 41:
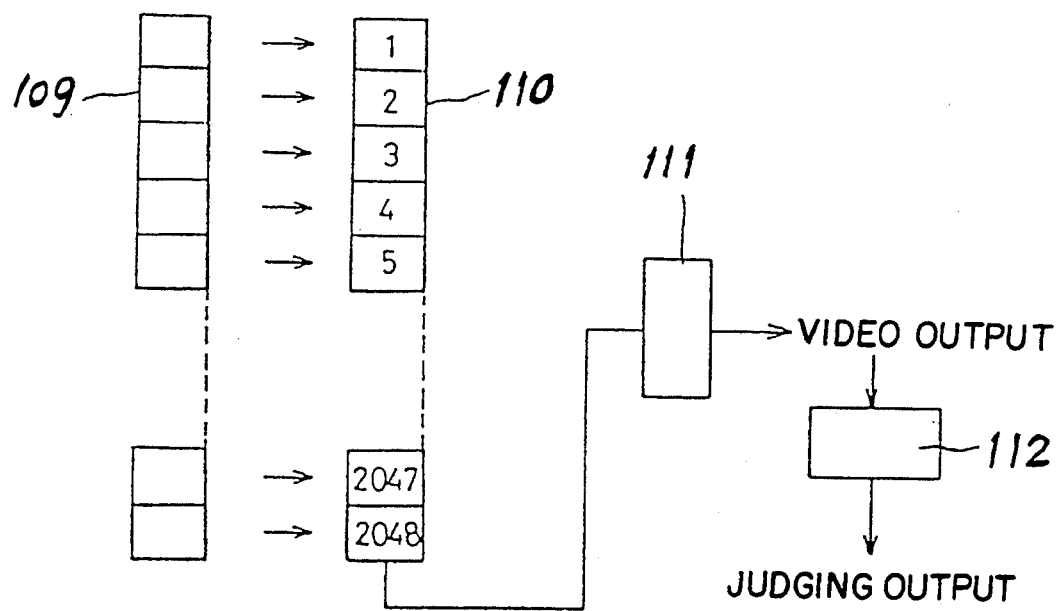
FIG. 41 is a block diagram showing the arrangement of an optical scanner using an image sensor.
Figure 42:
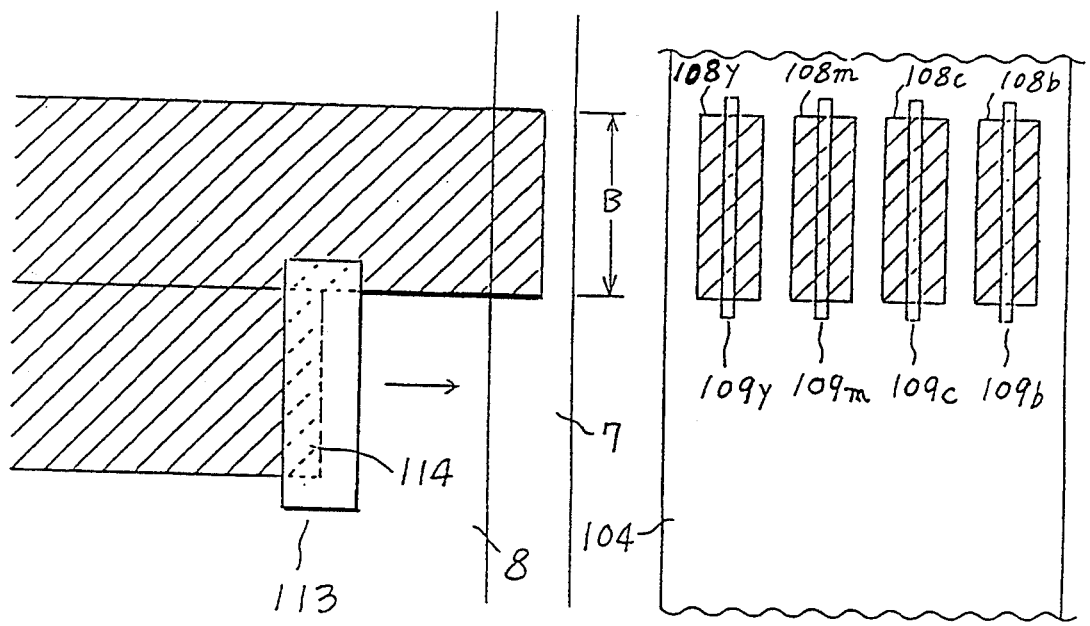
FIG. 42 is a schematic plan view showing the actual manner of printing a continuous web and a test web.
Figure 43C:
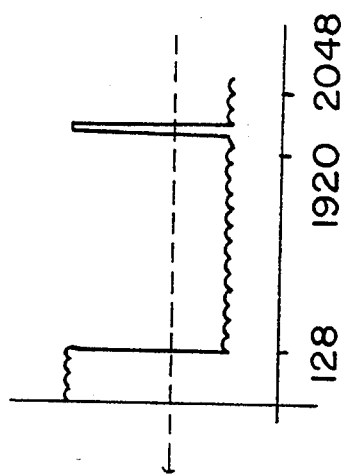
FIG. 43A-FIG. 43C are diagrams showing video output waveforms.
Figure 43B:
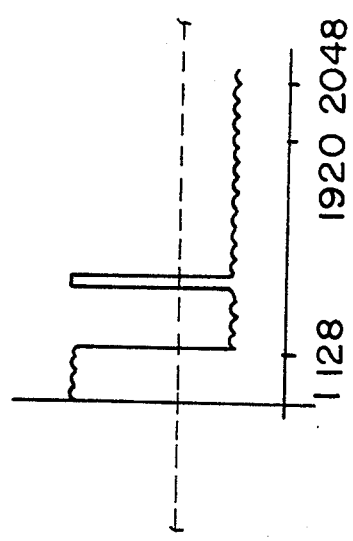
Figure 43A:
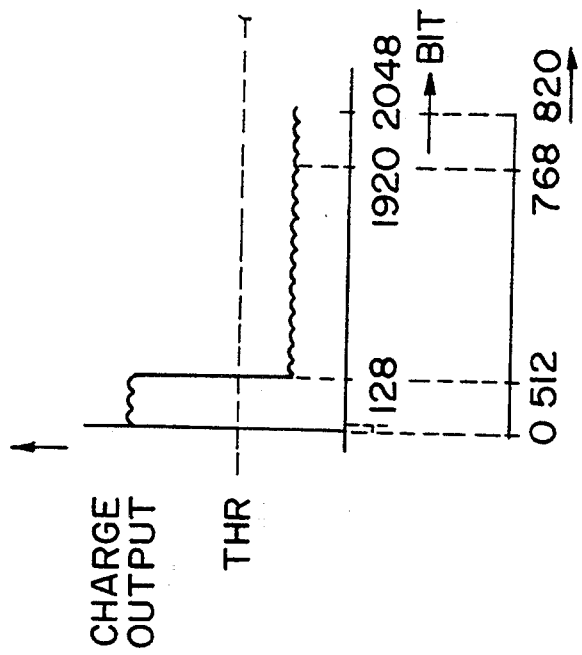
Figure 44:
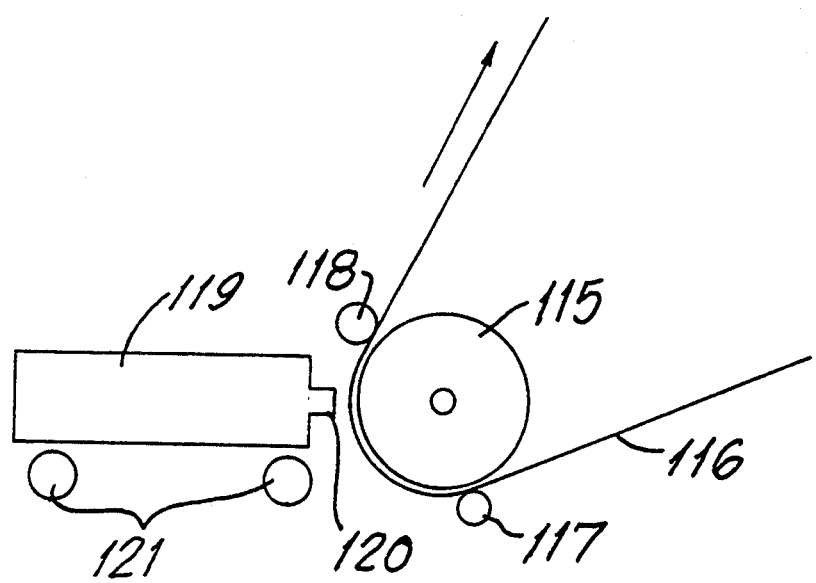
FIG. 44 is a side view of conventional continuous printing apparatus.

As shown in FIG. 41, 2048 elements are arranged in one row with 13 μm pitch for each row of the light-receiving element 109. It means that, in the case 256 nozzles are used in each row of the nozzle head, 7 bits of the light-receiving element correspond to one nozzle and each 128 spare bits are disposed before and after them to give a total of 2048 elements (128+7×256+128=2048). Each light-receiving element converts the light energy to an electric charge when a reflected comes from the printed continuous web and accumulates it. Thus, the electric charge is accumulated depending on the intensity of the light. The accumulated electric charge is transferred in a moment to an analog register 110 by an indication of the control device not shown in the figure and then transferred to an output gate 111 successively. From the output gate 111, video outputs at voltage levels (analog value) proportional to the electric charge level of the light-receiving element are output in the order from the lowset order bit to the highest order bit (1→2048) and judged by the judging portion 112 as described below.

The imaging areas 109y, 109m, 109c and 109b given by the image sensors in which the light-receiving elements are arranged in four rows are, as shown in FIG. 40, made to be somewhat larger than the print width B printed on the test web 104. The print width B is determined by each nozzle row 114 of the ink jet head 113 and the continuous web is successively printed by the print width B for each intermittent transportation of the continuous web 8. The imaging area of the image sensor is somewhat larger than the print width B because the light-receiving elements are disposed corresponding to the nozzles of the image sensor and spare bits are disposed before and after them. When the test web 104 on which ink drops are sprayed from all nozzles of each heads is scanned optically by the image sensor, the video outputs are output at each imaging areas 109y, 109m, 109c and 109b in the order from the lowest order bit to the highest order bit as described above. FIGS. 41 (a), (b) and (c) show examples of video output. In the case of no clogging, the output is as shown in FIG. 41 (a). Thus, at an image area corresponding to the lower orders of the light-receiving element, 1 to 128 bit, the ink is not printed yet on the test continuous web and the reflected light is intensive by the ground color of the test web and the charge output is high and hence the voltage level of the video output becomes also high. The intensity of the reflected light at the imaging area of 129 to 1920 bits corresponding to the print width B on which the ink is sprayed from all nozzles and adhered and at the imaging area of 1921 to 2048 bits where the ink has been adhered during the preceeding carriage scanning are low as the ink is adhered and thus the voltage level of the video output becomes low. If clogging is formed in any nozzle row, as shown in FIG. 41 (b), the ink is not sprayed at the clogged portion from 128 to 1920 bits and the intensity of the reflected light becomes high and the site of high video output is detected as a peak. In the case an abnormality occurs in the transportation of the continuous web and thus a space is formed in the printing to the direction of main scanning, as shown in FIG. 41 (c), the intensity of the reflected light from the portion from 1920 to 2048 bits where the ink is not adhered becomes high and thus the portion of high video output is detected. If the clock signal sending the electric charge of the light-receiving element to the shift register is set to be 2.5 MHz, the corresponding bit of each light-receiving element can be also expressed based on the transfer period axis as shown in FIG. 41 (a).

As mentioned above, because the video output from the image sensor 105 is judged by the difference between the intensities of reflected lights from the site where the ink is adhered and the ground color of the continuous web, any clogging of the nozzle of the ink nozzle head can be easily detected if the judging level THR is properly defined. In addition, as one nozzle of the multinozzle head is corresponded by a plural of light-receiving elements to detect clogging, the clogged nozzle can be specified and the clog-removing work can be carried out surely and easily. As the ink is applied actually for the detection, there is no restriction for the type of the ink and no power source for charging is required for the clog detection to eliminate the danger of spark. Although the type of the nozzle head was not particularly described, as apparent from the above explanation, it may be of continuous type or of on-demand type and can correspond to a multinozzle head of high density.

What is claimed is:

1. A continuous web printing apparatus comprising:
    transport means including an endless belt made of metal and having a sticky surface, a plurality of support rollers having said endless belt entrained therearound, and drive means for rotating said support rollers to move said endless belt;

press means for pressing a continuous web, such as a fabric or a transfer sheet, against said endless belt to stick said continuous web to said endless belt;

an ink jet head disposed between said support rollers in opposed relation to the surface of said continuous web stuck to said endless belt;

an abutment adapted to abut against said endless belt, said abutment being opposed to said ink jet head with said continuous web and said endless belt interposed therebetween;

head gap adjusting means for moving at least either of said ink jet head or said abutment in a direction in which the two are opposed to each other; and recovering means for peeling said continuous web, which has passed by said ink jet head, from said endless belt for recovery.

2. A continuous web printing apparatus as set forth in claim 1, wherein said abutment has a greater width in the transport direction than the width of the ink jet head in the same direction.

3. A continuous web printing apparatus as set forth in claim 1, further comprising means for washing said sticky surface of the endless belt.

4. A continuous web printing apparatus comprising;

transport means including an endless belt having a sticky surface, a plurality of support rollers having said endless belt entrained therearound, and drive means for rotating said support rollers to move said endless belt;

press means for pressing a continuous web, such as a fabric or a transfer sheet, against said endless belt to stick said continuous web to said endless belt;

an ink jet head disposed between said support rollers in opposed relation to the surface of said continuous web stuck to said endless belt;

an abutment adapted to abut against said endless belt, said abutment being opposed to said ink jet head with said continuous web and said endless belt interposed therebetween;

head gap adjusting means for moving at least either of said ink jet head or said abutment in a direction in which the two are opposed to each other;

recovering means for peeling said continuous web, which has passed by said ink jet head, from said endless belt for recovery; and wherein said endless belt comprising an endless belt having an adhesive double coated sheet stuck thereto.

5. A continuous web printing apparatus as set forth in claim 4, wherein said adhesive double coated sheet consists of a synthetic resin film and adhesive layers formed on both surfaces of the synthetic resin film, fine pores being formed in said synthetic resin film and said adhesive layers.

6. A continuous web printing apparatus as set forth in claim 4, wherein said adhesive double coated sheet consists of a nonwoven fabric and a fine porous adhesive film, said nonwoven fabric having a SMD value of not higher than 10 microns measured by KES system, an organic solvent solution of a synthetic polymer being coated on both surfaces of said nonwoven fabric and then immersed in a coagulation bath, said fine porous adhesive film being formed by said synthetic polymer.

7. A continuous web printing apparatus comprising:

transport means including an endless belt having a sticky surface, a plurality of support rollers having said endless belt entrained therearound, and drive means for rotating said support rollers to move said endless belt;

press means for pressing a continuous web, such as a fabric or a transfer sheet, against said endless belt to stick said continuous web to said endless belt;

an ink jet head disposed between said support rollers in opposed relation to the surface of said continuous web stuck to said endless belt;

an abutment adapted to abut against said endless belt, said abutment being opposed to said ink jet head with said continuous web and said endless belt interposed therebetween;

head gap adjusting means for moving at least either of said ink jet head or said abutment in a direction in which the two are opposed to each other;

recovering means for peeling said continuous web, which has passed by said ink jet head, from said endless belt for recovery;

a color transform device for performing reductional color separation so as to transform an input image including numerous kinds of colors to an output image including smaller kinds of colors, said input having been read by a digital image input device and being composed of a plurality of pixels each of which has a digital image data containing at least RGB color value, said color transform device further comprising, input image data storage means for storing the image data of said input image, output target color storage means for storing a predetermined number of output target colors to which any pixel color of said input image is to be converted, pixel color conversion means for calculating distances from the pixel color to said output target colors in a three-dimensional RGB color space with respect to each of the pixels of said input image, based on the image data stored in said input image data storage means, and converting the pixel colors of said input image into the output target colors located at a minimum distance from the respective pixels, and output image data storage means for storing the image data of said input image converted into said output target colors; and a digital image output device to which said ink jet head is connected including an RGB/YMCBk transform device for transforming the RGB signals received from said output image data storage means of said color transform device to YMCBk signals so as to output the YMCBk signals to said ink jet head for printing the output image.

8. A continuous web printing apparatus comprising:

transport means including an endless belt having a sticky surface, a plurality of support rollers having said endless belt entrained therearound, and drive means for rotating said support rollers to move said endless belt;

press means for pressing a continuous web, such as a fabric or a transfer sheet, against said endless belt to stick said continuous web to said endless belt;

an ink jet head disposed between said support rollers in opposed relation to the surface of said continuous web stuck to said endless belt;

an abutment adapted to abut against said endless belt, said abutment being opposed to said ink jet head with said continuous web and said endless belt interposed therebetween;

head gap adjusting means for moving at least either of said ink jet head or said abutment in a direction in which the two are opposed to each other;

recovering means for peeling said continuous web, which has passed by said ink jet head, from said endless belt for recovery;

a color transform device for performing reductional color separation so as to transform an input image including numerous kinds of colors to an output image including smaller kinds of colors, said input image having been read by a digital image input device and being composed of a plurality of pixels each of which has a digital image data containing at least RGB color value, said color transform device further comprising, input image data storage means for storing the image data of said input image, color space division means for dividing a three-dimensional RGB color space into a plurality of subspaces;

pixel number counting/color value calculation means for counting the number of pixels included in each of said subspaces, and calculating an RGB color value for each of said subspaces, based on the image data stored in said input image data storage means;

output target color selection means for selecting a predetermined m subspaces in descending order of the number of pixels included in said subspaces, and defining the RGB color values of the selected subspaces as output target colors;

pixel color conversion means for calculating distances from the pixel color to said output target colors in said RGB color space with respect to each of the pixels of said input image, based on the image data stored in said input image data storage means, and converting the pixel colors of said input image into the output target colors located at a minimum distance from the respective pixels, and output image data storage means for storing the image data of said input image converted into the output target colors; and a digital image output device to which said ink jet head is connected including an RGB/YMCBk transform means for transforming RGB signals received from said output image data storage means of said color transform device to YMCBk signals so as to output the YMCBk signals to said ink jet head for printing the output image.

9. A continuous web printing apparatus comprising:

transport means including an endless belt having a sticky surface, a plurality of support rollers having said endless belt entrained therearound, and drive means for rotating said support rollers to move said endless belt;

press means for pressing a continuous web, such as a fabric or a transfer sheet, against said endless belt to stick said continuous web to said endless belt;

an ink jet head disposed between said support rollers in opposed relation to the surface of said continuous web stuck to said endless belt;

an abutment adapted to abut against said endless belt, said abutment being opposed to said ink jet head with said continuous web and said endless belt interposed therebetween;

head gap adjusting means for moving at least either of said ink jet head or said abutment in a direction in which the two are opposed to each other;

recovering means for peeling said continuous web, which has passed by said ink jet head, from said endless belt for recovery; and drive means operatively connected to supporting means supporting said press means, for moving said supporting means and said press means so that said press means is retracted from said endless belt to be spaced from said continuous web and said press means is advanced toward said endless belt to be pressed against said continuous web; and a control device connected to said drive means for controlling said drive means so that said press means is spaced from said continuous web, after said endless belt is stopped, and controlling said drive means so that said press means is pressed against said continuous web, before said endless belt is driven again.

10. A continuous web printing apparatus comprising:

transport means including an endless belt having a sticky surface, a plurality of support rollers having said endless belt entrained therearound, and drive means for rotating said support rollers to move said endless belt;

press means for pressing a continuous web, such as a fabric or a transfer sheet, against said endless belt to stick said continuous web to said endless belt;

an ink jet head disposed between said support rollers in opposed relation to the surface of said continuous web stuck to said endless belt;

an abutment adapted to abut against said endless belt, said abutment being opposed to said ink jet head with said continuous web and said endless belt interposed therebetween;

head gap adjusting means for moving at least either of said ink jet head or said abutment in a direction in which the two are opposed to each other;

recovering means for peeling said continuous web, which has passed by said ink jet head, from said endless belt for recovery;

edge sensor means disposed along the transporting path of the continuous web and positioned near the edge of the continuous web for detecting the edge of the continuous web when the continuous web meanders;

meandering correcting means for correcting the meandering of the continuous web in response to the detection signal from said edge sensor means;

web sensor means disposed along the transporting path of the continuous web and positioned near the center of the continuous web for detecting the presence of the continuous web;

alarm means; and a control device connected to said edge sensor means, said web sensor means and said alarm means for judging the malfunction of each sensors by the combination of the detection signals of the sensors to control said alarm means.

11. A continuous web printing apparatus comprising:

transport means including an endless belt having a sticky surface, a plurality of support rollers having said endless belt entrained therearound, and drive means for rotating said support rollers to move said endless belt;

press means for pressing a continuous web, such as a fabric or a transfer sheet, against said endless belt to stick said continuous web to said endless belt;

an ink jet head disposed between said support rollers in opposed relation to the surface of said continuous web stuck to said endless belt;

an abutment adapted to abut against said endless belt, said abutment being opposed to said ink jet head with said continuous web and said endless belt interposed therebetween;

head gap adjusting means for moving at least either of said ink jet head or said abutment in a direction in which the two are opposed to each other;

recovering means for peeling said continuous web, which has passed by said ink jet head, from said endless belt for recovery;

a pair of seam detecting means disposed upstream of said press means and spaced to each other widthwise of the continuous web for detecting the seam of the continuous web;

a control device connected to said transport means, said ink jet head, said recovering means and said detecting means for controlling said transport means, said ink jet head and said recovering means in response to the detection signals from the detecting means after detection of the seam, to not run said ink jet head and vacantly transport the continuous web when the seam of the continuous web passes by the ink jet head, and to stop said transport means, said ink jet head and said recovering means when the continuous web is transported by a predetermined distance after seam of the continuous web is detected by one of said detecting means and the seam of the continuous web is then not detected by the other detecting means.

12. A continuous web printing apparatus comprising:

transport means including an endless belt having a sticky surface, a plurality of support rollers having said endless belt entrained therearound, and drive means for rotating said support rollers to move said endless belt;

press means for pressing a continuous web, such as a fabric or a transfer sheet, against said endless belt to stick said continuous web to said endless belt;

an ink jet head disposed between said support rollers in opposed relation to the surface of said continuous web stuck to said endless belt;

an abutment adapted to abut against said endless belt, said abutment being opposed to said ink jet head with said continuous web and said endless belt interposed therebetween;

head gap adjusting means for moving at least either of said ink jet head or said abutment in a direction in which the two are opposed to each other;

recovering means for peeling said continuous web, which has passed by said ink jet head, from said endless belt for recovery; and a clogging detecting device for detecting a clogging in the nozzle means of said ink jet head, said detecting device comprising;

a clogging detecting area disposed beside the continuous web which is printed, a test web being directed to said area and printed by said nozzle means;

sensor means for optically detecting the printing on said test web;

means for judging the clogging in the nozzle means by the difference between the intensities of light from the printed portion and the not printed portion in the output from said sensor means.

13. A continuous web printing apparatus comprising:

transport means including an endless belt having a sticky surface, a plurality of support rollers having said endless belt entrained therearound, and drive means for rotating said support rollers to move said endless belt;

press means for pressing a continuous web, such as a fabric or a transfer sheet, against said endless belt to stick said continuous web to said endless belt;

an ink jet head disposed between said support rollers in opposed relation to the surface of said continuous web stuck to said endless belt;

an abutment adapted to abut against said endless belt, said abutment being opposed to said ink jet head with said continuous web and said endless belt interposed therebetween;

head gap adjusting means for moving at least either of said ink jet head or said abutment in a direction in which the two are opposed to each other;

recovering means for peeling said continuous web, which has passed by said ink jet head, from said endless belt for recovery;

a color transform device for performing reductional color separation so as to transform an input image including numerous kinds of colors to an output image including smaller kinds of colors, said input image having been read by a digital image input device and being composed of a plurality of pixels each of which has a digital image data containing at least RGB color value, said color transform device further comprising, input image data storage means for storing the image data of said input image, pixel number counting means for counting the number of pixels for each of the RGB color values so as to generate a histogram and storing data of the histogram, based on the image data stored in said input image data storage means, color value distribution area calculation means for defining a distribution area of the RGB color values by which a three-dimensional RGB color space is occupied and evaluating a volume of the color value distribution area, based on the image data stored in said input image data storage means, distance between output target colors calculating means for calculating a radius of a spherical space whose volume corresponds to the value obtained by division of the volume of said color value distribution area by "m" and defining the double radius as a distance between output target colors, output target color selection means for selecting the RGB color value with the highest frequency as a first output target color, and excluding RGB color values included in a spherical space which is drawn round the position of said first output target color with a radius corresponding to said distance between output target colors in said RGB color space, and selecting the RGB color value with the highest frequency among residual RGB color values as a second output target color, and repeating a similar procedure until an "$m-th$" output target color is selected, and if all of the RGB color values are excluded before the "$m-th$" output target color is selected, repeating said similar procedure in the overlapped regions of spherical spaces drawn round the positions of the selected output target colors with the radii corresponding to said distance between output target colors in said RGB color space, pixel color conversion means for calculating distances from the pixel color to said output target colors in said three dimensional RGB color space with respect to each of the pixels of said input image, based on the image data stored in said input image data storage means, and converting the pixel colors of said input image into the output target colors located at a minimum distance from the respective pixels, and output image data storage means for storing the image data of said input image converted into the output target colors; and a digital image output device to which said ink jet head is connected including an RGB/YMCBk transform means for transforming RGB signals received from said output image data storage means of said color transform device to YMCBk signals so as to output the YMCBk signals to said ink jet head for printing the output image.

* * * * *